(12) United States Patent
Vasylyev

(10) Patent No.: US 9,097,826 B2
(45) Date of Patent: Aug. 4, 2015

(54) COLLIMATING ILLUMINATION SYSTEMS EMPLOYING A WAVEGUIDE

(71) Applicant: Sergiy Vasylyev, Elk Grove, CA (US)

(72) Inventor: Sergiy Vasylyev, Elk Grove, CA (US)

(73) Assignee: SVV TECHNOLOGY INNOVATIONS, INC., Sacramento, CA (US)

(*) Notice: Subject to any disclaimer, the term of this patent is extended or adjusted under 35 U.S.C. 154(b) by 11 days.

(21) Appl. No.: 13/647,175

(22) Filed: Oct. 8, 2012

(65) Prior Publication Data
US 2014/0098558 A1   Apr. 10, 2014

Related U.S. Application Data

(60) Provisional application No. 61/545,142, filed on Oct. 8, 2011.

(51) Int. Cl.
F21V 7/04 (2006.01)
F21V 8/00 (2006.01)

(52) U.S. Cl.
CPC ............ *G02B 6/0036* (2013.01); *G02B 6/0045* (2013.01)

(58) Field of Classification Search
CPC .... G02B 6/0001; G02B 26/36; G02B 6/0015; G02B 6/0016; G02B 6/0018; G02B 6/002; G02B 6/0033; G02B 6/0035; G02B 6/0036; G02B 6/0038; G02B 6/26; G02B 6/32
USPC .............. 385/33, 31; 362/330, 555, 559–561, 362/617–626
See application file for complete search history.

(56) References Cited

U.S. PATENT DOCUMENTS

| | | | |
|---|---|---|---|
| 5,067,831 A | 11/1991 | Robbins et al. | |
| 5,432,876 A | 7/1995 | Appeldorn et al. | |
| 5,526,190 A * | 6/1996 | Hubble et al. | 359/719 |
| 5,631,994 A | 5/1997 | Appeldorn et al. | |
| 5,845,038 A | 12/1998 | Lundin et al. | |
| 5,905,837 A | 5/1999 | Wang et al. | |
| 6,289,150 B1 * | 9/2001 | Zarian et al. | 385/31 |
| 6,367,941 B2 | 4/2002 | Lea et al. | |
| 6,488,397 B1 | 12/2002 | Masutani et al. | |
| 6,546,174 B2 | 4/2003 | Clarkin | |
| 7,151,874 B2 * | 12/2006 | Li | 385/43 |
| 7,330,632 B1 | 2/2008 | Buelow et al. | |
| 7,374,313 B2 | 5/2008 | Cassarly et al. | |
| 7,549,783 B2 | 6/2009 | Cassarly et al. | |
| 7,817,885 B1 * | 10/2010 | Moore et al. | 385/33 |
| 8,189,970 B2 * | 5/2012 | Moore et al. | 385/33 |
| 8,290,318 B2 * | 10/2012 | Vasylyev | 385/33 |
| 2010/0278480 A1 * | 11/2010 | Vasylyev | 385/33 |
| 2010/0329619 A1 * | 12/2010 | Moore et al. | 385/129 |
| 2012/0057357 A1 * | 3/2012 | Kim et al. | 362/373 |

* cited by examiner

Primary Examiner — Jason Moon Han

(57) ABSTRACT

An illumination system employing an elongated waveguide having a non-round transversal cross-section and having at least a portion of its surface shaped in the form of a linear collimating element. The waveguide further employs at least one array of light extracting features distributed along a longitudinal axis of the waveguide and disposed in the focal area of the respective linear collimating element. Each light extracting feature has an active aperture which is substantially less than the light receiving aperture of the linear collimating element and is configured to redirect light propagating in the waveguide generally towards a normal direction with respect to the longitudinal axis of the waveguide. Light rays redirected by the light extracting features are further collimated by the linear collimating element and exit from the waveguide in the form of a directional beam.

16 Claims, 15 Drawing Sheets

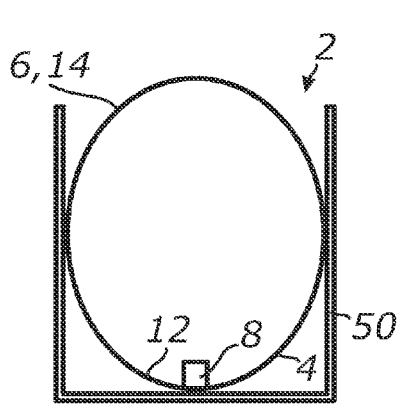 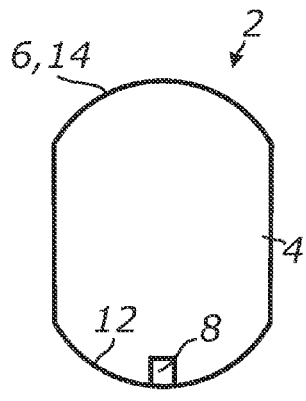 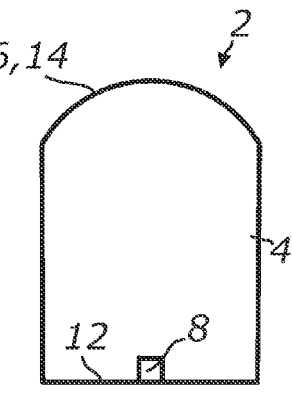
FIG. 17   FIG. 18   FIG. 19
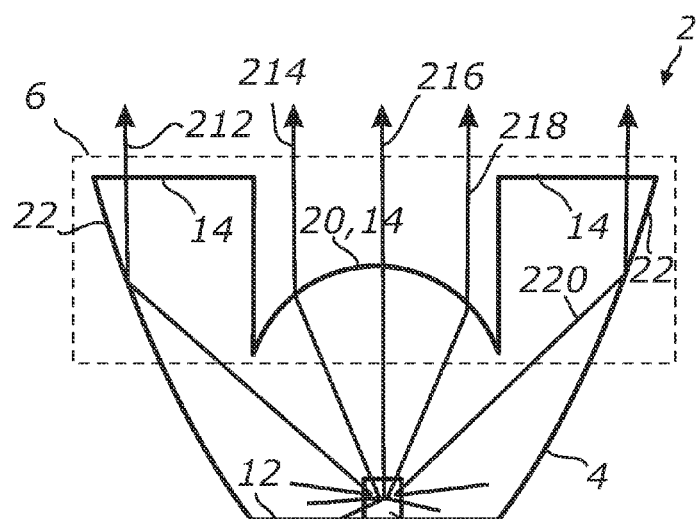
FIG. 20

US 9,097,826 B2

COLLIMATING ILLUMINATION SYSTEMS EMPLOYING A WAVEGUIDE

CROSS-REFERENCE TO RELATED APPLICATIONS

This application claims priority from U.S. provisional application Ser. No. 61/545,142 filed on Oct. 8, 2011, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The present invention relates to light emitting waveguides such light pipes, optical fibers or planar waveguides provided with a series of optical elements distributed along the optical path to provide for a controlled illumination pattern. This invention also relates to optical illuminators and light distribution systems employing such waveguides, for example, side-emitting optical fibers, panel luminaires, edge-lit LED backlights and lighting panels, LCD display backlights, computer screens, advertising displays, road signs, and the like, as well as to a method for redistributing light from a variety of light sources.

2. Description of Background Art

Conventionally, illumination systems incorporating optical waveguides use the Total Internal Reflection (TIR) as the means for light propagation through the waveguide which is usually made from a transparent dielectric material. The waveguides comprise a core, commonly of an inorganic glass or polymeric plastic material, which can be surrounded by air in which case the light propagation by means of TIR can occur for the broadest range of propagation angles for a given core material. Alternatively, the waveguide may further incorporate a cladding layer that has a lower refractive index than the waveguide material in order to maintain the TIR properties for the core. This provides protection of the core from the environment, but also usually narrows the range of propagation angles compared to the optical interface formed by the waveguide's core with air.

The side-emitting optical fibers are usually illuminated from one or both terminal ends and have a series of some sort of light reflecting or scattering elements distributed along the fiber and causing portions of the light propagating in the fiber to leak outside at the controlled locations so that the light can be uniformly emitted along the entire length of the fiber.

The planar waveguides of edge-lit backlighting panels and luminaires can be illuminated from one or up to four its edges, which is conventionally done using individual LED's or LED strips. The light reflective or scattering elements are usually distributed along the planar surface opposite to the light emitting surface according to a predefined pattern in order to obtain a uniform surface brightness.

However, these prior art devices usually lack the collimating ability as the light outcoupled from the waveguide by the reflectors or scattering elements emerges from the waveguide highly divergent. This divergence is defined by the multitude of light propagation angles in the waveguide and by the properties of the reflectors. In many applications, however, an improved collimation can be required, for example, in order to increase the lighting panel luminosity toward a given direction or improve the irradiance intensity on an object that the waveguide-based backlight is illuminating.

It is therefore an object of this invention to provide an improved illumination system employing a waveguide structure with efficient light outcoupling and collimation that would enhance the energy efficiency and the utility of the device. The present invention solves the above problems by providing a portion of the waveguide that is shaped in the form of a linear collimating lens or a plurality of parallel collimating lens and by further providing a string of light-outcoupling optical reflectors disposed in proximity of the focal line of the collimating lens. As each reflector extracts a small portion of the light propagating in the waveguide from waveguide's longitudinal surface, the collimating lens intercepts and collimates the extracted light in at least one dimension, particularly in a plane perpendicular to the longitudinal axis of the waveguide or to the prevailing direction of light propagation in the waveguide. Other objects and advantages of this invention will be apparent to those skilled in the art from the following disclosure.

BRIEF SUMMARY OF THE INVENTION

Accordingly, the present invention is directed to side-emitting optical waveguides which employ light extracting features distributed along a waveguide's optical axis. Additionally, this invention is directed to any lighting application that requires a broad-area light source with enhanced beam directionality.

An advantage of the present system is to provide a side-emitting waveguide with one or more optical collimation elements extending along the longitudinal axis of the waveguide and disposed in light receiving relationship with respect to a series of the light extracting features. According to aspect of the present invention, each light extracting element has a substantially smaller transversal aperture than the collimating element and is disposed in the focal area of the respective collimating element.

In at least one embodiment, the invention features a cylindrical waveguide structure extending along a longitudinal axis and configured to conduct light in response to light propagation through to the optically transmissive body of the waveguide and a total internal reflection from the longitudinal walls of the waveguide. At least one portion of the longitudinally extending surface of the waveguide is shaped in the form of a collimating optical element. The optical element is configured to have a focal area at least a portion of which is located within the boundary of the waveguide. The waveguide further includes a plurality of light extraction features distributed along the longitudinal axis of the waveguide and disposed in the focal area of the collimating element. Light is input into at least one terminal end of the waveguide is directed through the waveguide and extracted from the waveguide by means of redirection by the light extraction features. The light rays redirected by the light extracting features pass through the active aperture of the collimating element and are further collimated by the collimating element. The net result is an overall improvement in the directionality of the emitted beam.

In at least one embodiment, the invention features a series of light-collimating cylindrical waveguides incorporated in an array to form a planar waveguide. The resulting planar waveguide includes a surface portion shaped in the form of an array of light collimating elements extending along a reference line. Each collimating elements is associated with a strip of light extraction features disposed in the focal area of the respective collimating element and extending parallel to the longitudinal axis of the collimating element. At least a substantial part of light rays propagating in the planar waveguide is extracted and collimated towards a perpendicular to a broad-area surface or prevailing plane of the waveguide.

BRIEF DESCRIPTION OF THE SEVERAL VIEWS OF THE DRAWING(S)

The invention will be more fully understood by reference to the following drawings which are for illustrative purposes only:

FIG. 17 is a schematic cross-sectional view of a collimating illumination system, showing a channel holder for a waveguide, according to at least one embodiment of the present invention.

FIG. 18 is a schematic view of a collimating illumination system, showing an alternative transversal cross-section for a waveguide, according to at least one embodiment of the present invention.

FIG. 19 is a schematic view of a collimating illumination system, showing a further alternative transversal cross-section for a waveguide, according to at least one embodiment of the present invention.

FIG. 20 is a schematic view of a collimating illumination system, showing a refractive and reflective surfaces in a waveguide, according to at least one embodiment of the present invention.

DETAILED DESCRIPTION OF THE INVENTION

Referring more specifically to the drawings, for illustrative purposes the present invention is embodied in the apparatus generally shown in the preceding figures. It will be appreciated that the apparatus may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

A wide range of applications exist for the present invention in relation to the collection of electromagnetic radiant energy, such as light, in a broad spectrum or any suitable spectral bands or domains. Therefore, for the sake of simplicity of expression, without limiting generality of this invention, the term "light" will be used herein although the general terms "electromagnetic energy", "electromagnetic radiation", "radiant energy" or exemplary terms like "visible light", "infrared light", or "ultraviolet light" would also be appropriate.

Furthermore, it will be appreciated that the light incidence onto a surface is ordinarily associated with an angle of incidence, or incidence angle, which is commonly counted off a normal to the surface. Therefore, unless otherwise noted, the term incidence angle of a ray with respect to a surface will refer herein to the angle that the ray makes to the surface normal at the point of entry.

Figure 1:
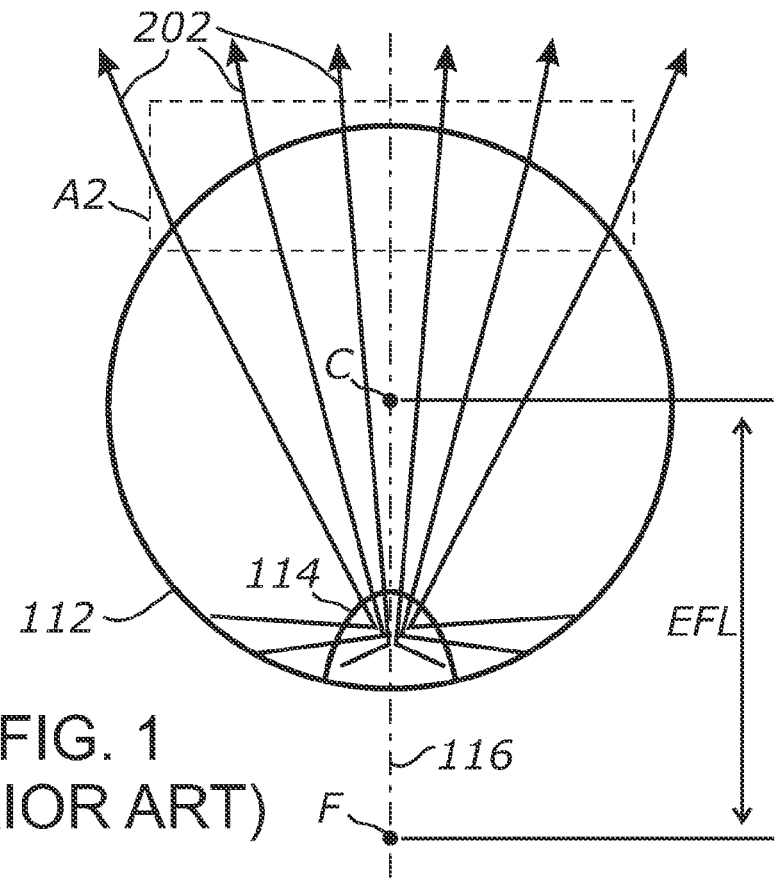
FIG. 1 is a schematic diagrams and ray tracing for conventional waveguide illumination systems employing an optical fiber.
Figure 2:
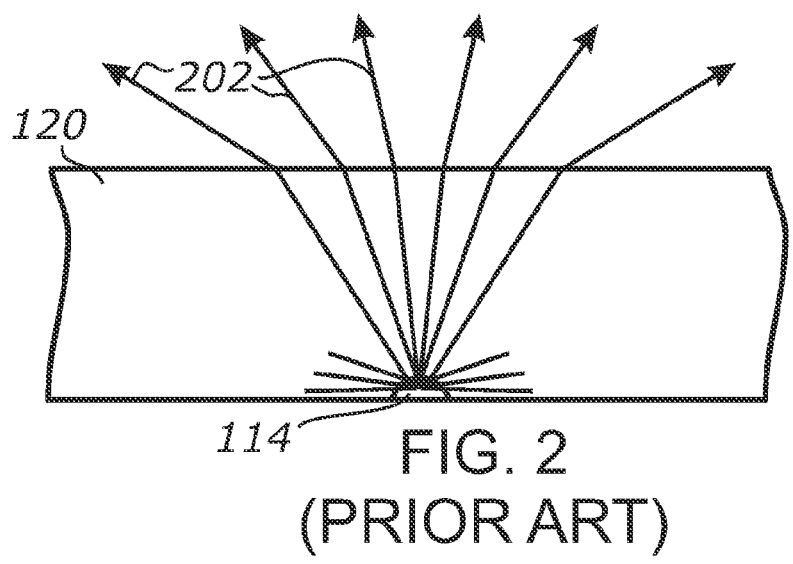
FIG. 2 is a schematic diagrams and ray tracing for conventional waveguide illumination systems employing a planar waveguide.

In order to be able to compare and contrast the present invention with typical light emitting waveguide structures, FIG. 1 and FIG. 2 are shown to illustrate the operation of conventional waveguide-based illumination devices. In FIG. 1, a schematic diagram of a side-emitting optical fiber 112 is shown in a cross-section perpendicular to the longitudinal axis of the fiber. The optical fiber 112 has a series of reflectors 114 formed by small cuts or notches in the wall of the fiber.

Referring further to FIG. 1, light rays 202 propagating in optical fiber 112 by means of TIR strike an individual reflector 114 and are directed toward the light emitting portion of the fiber surface which is indicated as A2. When the incidence angle of the reflected rays onto the light emitting surface is less than the TIR angle, the rays can be decoupled from optical fiber 112 and emanated from the respective side of the fiber. These rays, however, will generally have a considerable divergence, particularly, in the plane perpendicular to the fiber's axis, as illustrated in FIG. 1. This effect is explained below in further detail.

As the optical fiber conventionally has a cylindrical configuration with the circular cross-section, it can be viewed as a cylindrical lens having a linear focus located at point F and being characterized by an optical axis 116 in the plane of the drawing. According to the so-called lens maker's equation for a thick lens, the effective focal length EFL, or the distance from the center C of the lens to the focal point F, can be found from the following relationship:

$$\frac{1}{EFL} = (n-1)\left(\frac{1}{R_1} - \frac{1}{R_2} + \frac{(n-1)t}{nR_1R_2}\right),$$

where n is the refractive index of the lens material, t is the lens thickness, and $R_1$ and $R_2$ are the radii of curvature of the front and rear lens surface, respectively.

In the case of cylindrical fiber, $R_1=R_2=R$ and $t=2R$, where R is the fiber radius. Side emitting optical fibers are typically made from a polymer such as polymethyl methacrylate (PMMA), or similar polymers, which has a refractive index of 1.49. Accordingly, for an exemplary case of PMMA fiber with a 5 mm radius, obtain: EFL≈7.6 mm. This means that the focus of the conventional optical fiber is far outside of the fiber's body and that the reflectors cannot be reasonably positioned in the proximity of the focus, while positioning of a light emitting source in the focus is a prerequisite for the lens to be able to collimate light efficiently. The collimating ability of the conventional side-emitting fiber is also further limited by the finite size of the reflector. Even though the reflectors are commonly formed on the fiber's side opposite to the light emitting surface, each reflector spans certain area. This area extends even deeper into the fiber and farther away from the focus than the surface portion where the reflector is formed. As a result, the collimating ability of known side-emitting fibers is substantially limited.

In FIG. 2, a schematic diagram of an edge-lit backlight waveguide 120 is shown in a cross-section perpendicular to the prevailing propagation of light in the waveguide. The light dispersion is illustrated by rays 202 being decoupled from the waveguide by reflector 114 formed in the surface which is opposite to the light emitting surface of the waveguide. Since the rays propagating in waveguide 120 are randomly distributed in a broad angular range accepted by the waveguide, rays 202 strike reflector 114 also at random angles within a broad range. Therefore, the fan of rays redirected by the reflector is essentially divergent. As the rays being decoupled from the waveguide exit into the low-n medium, they deviate even further from the surface normal making the fan of emitted rays even more divergent.

Figure 3:
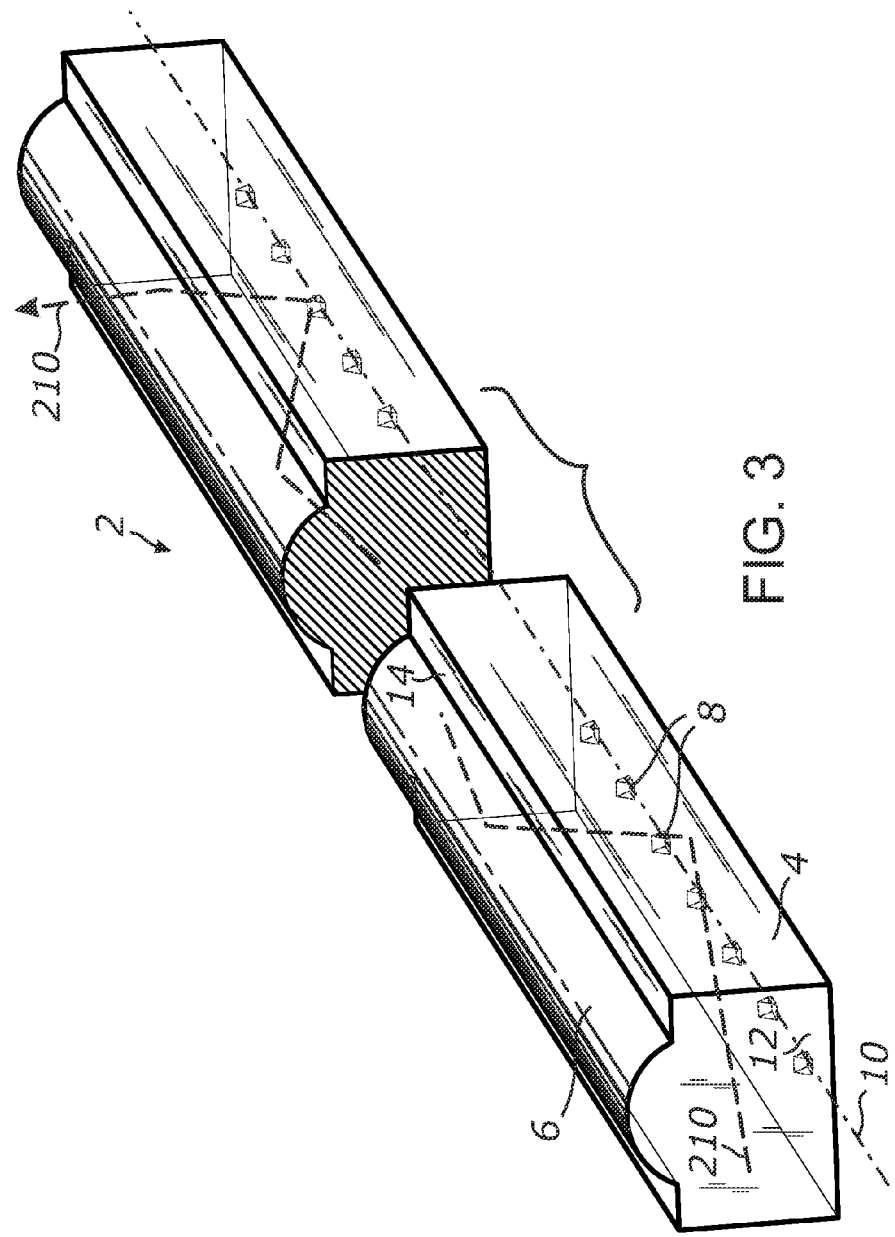
FIG. 3 is a schematic perspective view of a collimating illumination system, according to at least one embodiment of the present invention

FIG. 3 shows an embodiment of a collimating illumination system 2 in accordance with one embodiment of the present invention. Referring to FIG. 3, illumination system 2 comprises a cylindrical waveguide 4 of an optically transparent material. Waveguide 4 has an optically smooth surface and two opposing longitudinal walls represented by a top surface 12 and a bottom surface 14, respectively. Waveguide 4 further comprises a light emitting region extending along at least a portion of its length. A portion of the top surface 14 in the light emitting region is shaped in the form of an elongated collimating element extending along the longitudinal axis of waveguide 4.

The elongated collimating element is exemplified in FIG. 3 by a linear refractive lens 6 having a convex shape with the spherical profile in a cross-section. The refractive lens 6 is configured to have a linear focus or focal area located near the opposing longitudinal surface portion 12 of waveguide 4. In FIG. 3, the focal area of lens 6 is located near the longitudinal midline of bottom surface 12 of waveguide 4, as indicated by a reference line 10. Illumination system 2 further comprises a plurality of optical elements exemplified by discreet reflectors 8 formed in surface 12 of the waveguide and distributed along the focal line of collimating lens 6. Reflectors 8 are configured to illuminate lens 6 by receiving light propagating in waveguide 4 and redirecting such light toward the lens by means of TIR.

Reflectors 8 may comprise any suitable optical feature that can be formed in surface 12 for extracting light from waveguide 4. By way of example, each reflector 8 can be formed by any interruption, void, recess, bump, protrusion, deformity or discontinuity in surface 12 which defines one or more surfaces capable of reflecting at least a portion of light propagating in waveguide 4 towards the opposing wall of the waveguide and an incidence angle which is less than the TIR angle at that wall. Such reflectors 8 can be produced by any desirable means, including, but not limited to: laser ablation, micromachining, milling, cutting, slitting, etching or otherwise indenting the surface 12, as well as by any suitable replication method including stamping, injection molding, compression molding, imprinting, embossing, and the like. Each reflector 8 may also include any light-scattering elements, such as white-paint dots, etched features in surface 12, surface texture, and the like.

The transversal area of each reflector 8 is selected to be substantially smaller than the transversal area of waveguide 4. Furthermore, the transversal size of each reflector 8 is preferred to be substantially smaller than the transversal size of collimating lens 6. More specifically, each of the transversal dimensions of the reflectors 8 should preferably be at least 5 to 10 times smaller than the width or diameter of collimating lens 6. When higher collimation is desired, the transversal dimensions of each reflector 8 may be 10 to 30 times smaller than the width of collimating lens 6. Particularly, for achieving the maximum collimation, the transversal size of each reflector 8 may also be advantageously selected to approximate the size of the focal area of lens 6.

Reflectors 8 may be formed directly in the body of waveguide 4. Alternatively, such reflectors may be formed in an external, optically transmissive film or plate which, in turn, may be attached to surface 12. By way of example and not limitation, each reflector 8 may be formed by a transversal V-shaped notch, groove or cut in the cylindrical body of waveguide 4. Each such reflector 8 may have at least one reflective surface inclined at an angle with respect to reference line 10 and/or surface 12. The dihedral angle that the reflective surface makes with the plane of surface 12 defines the light deflecting ability of reflector 8.

By way of a further non-limiting example, the dihedral angle of the reflective surface relatively to the plane of surface 12 can be about 45° and the intersection of the reflective surface with surface 12 can form a line perpendicular to reference line 10. It is noted, however, that the reflective surface of reflector 8 may take any other suitable dihedral angles with the plane of surface 12. Furthermore, it is noted that the reflective surface may also intersect surface 12 at an angle with respect to reference line 10 other than normal (e.g., representing a canted cut or notch with respect to the longitudinal axis of waveguide 4). The reflective surface may be made substantially planar although or, alternatively, may have a curved shape.

Reflectors 8 are configured to reflect at least a substantial part of the light impinging upon them in the waveguide. While it may be preferred in certain embodiments that the reflective surface of each reflector 8 is configured to reflect by means of TIR, such surface may also be mirrored to reflect by means of a specular reflection or scattering.

Referring further to FIG. 3, lens 6 is disposed in energy receiving relationship with respect to each of reflectors 8 and is configured to collimate the received light at least in a plane perpendicular to the longitudinal axis of waveguide 4. The collimation of light should be understood broadly in the context of this invention, without limiting its scope. The term "collimation" generally refers to reducing the divergence of light decoupled from the waveguide in one or more dimensions and/or planes as compared to the case when the divergence of light exiting the waveguide is primarily defined by the broad angular distribution of light propagating in the waveguide by means of TIR and/or by the optical properties of the reflectors which may themselves introduce or contribute to the beam divergence.

For the purpose of this invention and from the practical standpoint, the terms "focus" or "focal area" of collimating lens 6 should be understood broadly and generally refers to the area disposed at a distance from the lens's main optical surface where said lens may converge an incident parallel beam or, conversely, where a compact source of divergent light can be placed so that the divergent beam will be collimated into a paraxial or nearly-paraxial beam in response to the interaction with the lens. The focal area may include areas at a relatively small distance from the "ideal" focus of the lens in either direction including the areas located before or after focus along the optical axis of the lens as long as a cross-section of the envelope encompassing said areas is substantially smaller than the cross section of the lens. In the real-world applications, the focal area may also include the areas adjacent to the ideal focus of the lens and formed as a result of natural widening of the focal area by optical aberrations and/or manufacturing imperfections of the lens.

The elementary optical structure formed by each reflector 8 and the respective portion of lens 6 configured to intercept the divergent beam from the reflector may be hereinafter generally associated with the term "opticule". In the context of the present invention and referring to arrays of optical micro-components, we define the term "opticule" as an elementary combination of a larger-aperture primary focusing or collimating optical component and an associated smaller-aperture secondary optical component disposed in the primary's focus within the respective array. However, this term should be understood loosely and should not be interpreted as limiting the scope of the present invention in any way.

In accordance with at least one embodiment of the present invention, individual opticules may be formed by individual reflectors 8 and the corresponding portions of linear collimating lens 6 configured to intercept at least a substantial portion of light emitted by the reflectors. Depending on the density of reflectors 8 along the optical axis of collimating lens 6 and depending on the divergence of light emitted by the reflectors, the opticules may be spaced apart, adjacent to each other or overlapping by their lens portions.

Suitable materials for making waveguide 4 include but are not limited to optical glass, polymethyl methacrylate (PMMA), silicone, polycarbonate, polystyrene, polyolefin, and any optically clear resin which is obtainable by polymerization and curing of various compositions or other materials suitable for creating a sufficiently transparent structure.

According to one embodiment, waveguide 4 may be configured in the form of a rigid rod-like light pipe. The light pipe may be essentially straight or it may also be curved to a full 360° ring, partial ring, and various other shapes. According to one embodiment, waveguide 4 may also be made flexible and still conducting light by means of TIR, similarly to the flexible large-core optical fibers.

Waveguide 4 may be implemented without any cladding layer in which case light could propagate in the waveguide in some of the broadest possible range of propagation angles with respect to its longitudinal axis, as defined by the refractive index of the waveguide. Alternatively, a protective cladding layer may be provided around waveguide 4 in which case the acceptance angle of the waveguide may be somewhat reduced compared the exposed-surface case.

Waveguide 4 may be configured to receive light on one terminal end or on both of its ends. A suitable light source may include a light-emitting diode (LED), an incandescent lamp, a cold cathode fluorescent lamp (CCFL), sunlight focused by another optical system, a light-emitting end of an optical fiber, or any other suitable light emitting device.

The light source may also include multiple light emitting elements, such as LEDs, of the same color or different colors. The light source(s) may illuminate the terminal end from a distance by a collimated or focused light. Alternatively, the light source may also be positioned immediately adjacent to the light input end of waveguide 4. In the latter case, each light source can be attached to the light-receiving terminal end of the waveguide using an index matching optical adhesive or encapsulant to reduce or eliminate Fresnel reflections. By way of example, the adhesive or encapsulant may be conventionally made from a trasmissive polymer material that is curable by UV, visible light, heat, moisture or any other suitable means.

In operation, an exemplary ray 210 representing light injected into a light input end of waveguide 4 by a light source (not shown) propagates along waveguide 4 while undergoing multiple reflections from the longitudinal walls of the waveguide by means of TIR. The reflections may occur at any portion of the surface of waveguide 4 along its length, particularly including opposing surfaces 12 and 14, the side walls, as well as the surface of focusing lens 6 which can be made an integral part of waveguide 4.

Now, let's define a propagation angle being an angle between ray 210 and the longitudinal axis of waveguide 4. Let's further define an angle $\theta_{TIR}$ being a critical incidence angle at which TIR occurs in waveguide 4. It will be appreciated that, when ray 210 initially propagates in waveguide 4 at a propagation angle which is less than $90°-\theta_{TIR}$ and all of the longitudinal walls of waveguide 4 are parallel to the longitudinal axis, each interaction of ray 210 with the waveguide walls will also result in TIR. Ray 210 may therefore propagate along waveguide 4 considerable distances without reflection losses, since TIR is essentially lossless. Ray 210 will also continue to have essentially the same propagation angle along its path until it strikes any reflector 8 or exits from the opposing end of the waveguide 4. On the other hand, it will also be appreciated that the projection of the ray path onto a transversal cross-section plane of waveguide 4 may be characterized by essentially random propagation directions in that plane and random interactions of ray 210 with the waveguide walls.

Figure 4:
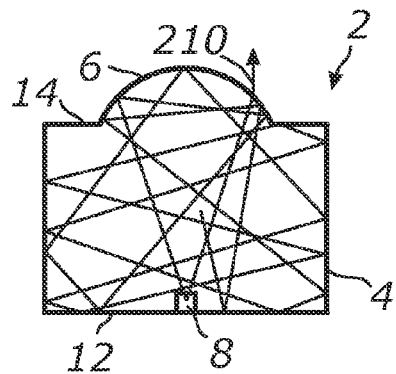
FIG. 4 is a schematic view and raytracing of a collimating illumination system, showing a projection of a light ray path, according to at least one embodiment of the present invention.

A projection of exemplary path of ray 210 onto a plane perpendicular to the longitudinal axis of waveguide 4 is depicted in FIG. 4, where ray 210 is shown undergoing multiple TIR interactions with the waveguide walls at various incidence angles in the above projection. Thus, ray 210 may be guided by means of TIR from planar bottom surface 12, the opposing top surface 14, which also includes the cylindrical surface of linear focusing lens 6, and the longitudinal side walls of waveguide 4 regardless of the specific cross-sectional geometry of the waveguide.

Referring now to both FIG. 3 and FIG. 4, ray 210 is shown eventually striking one of the reflectors 8 which redirects said ray toward the top surface 14 at a lower incidence angle than $\theta_{TIR}$ with respect to that surface. Lens 6 formed in surface 14 may intercept ray 210 and refract it out of waveguide 4. When reflector 8 is positioned in the focal area of lens 6, ray 210 will be refracted generally towards a direction parallel to the optical axis of the lens.

In order to provide high decoupling efficiency of light rays in system 2, the transversal apertures and spatial distribution of reflectors 8 may be selected as a function of the length and cross-sectional area of waveguide 4 so that at least a substantial part of light rays propagating in waveguide 4 may have a sufficiently high chance to encounter at least one reflector 8 along the propagation path.

Figure 5:
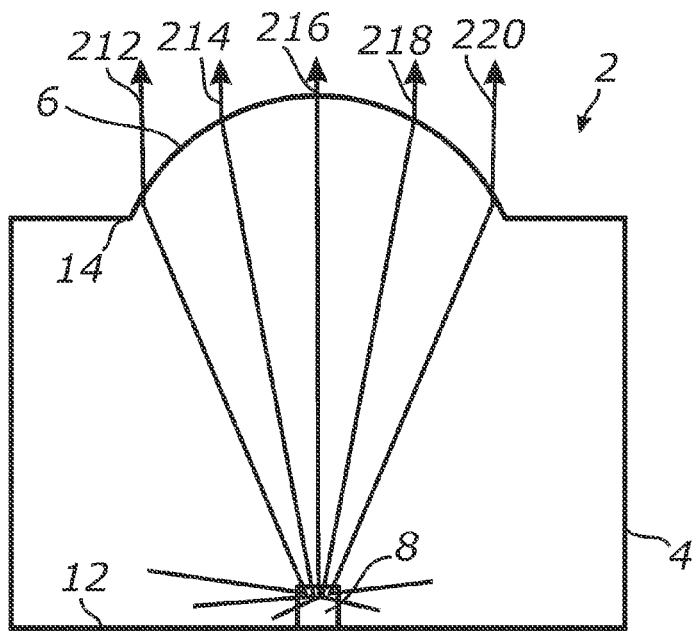
FIG. 5 is a schematic cross-sectional view and raytracing of a collimating illumination system, showing a fan of divergent rays being decoupled from a waveguide with collimation, according to at least one embodiment of the present invention.

FIG. 5 shows illumination system 2 of FIG. 3 in a cross-section perpendicular to the longitudinal axis of waveguide 4 and further illustrates the light extraction by an individual opticule formed by one reflector 8 and the respective portion of lens 6 that is disposed in the optical receiving relationship with respect to the reflector.

A fan of rays striking reflector 8 at surface 12 is reflected toward lens 6 located at the opposing surface 14. Lens 6 is configured to intercept at least a substantial part of rays leaving reflector 8. For this purpose, the transversal angular aperture or angular size of lens 6 (the angle at which the transversal aperture of the lens can be seen from the focal area) is selected to approximately match the anticipated angular spread of the fan of rays. It will be appreciated by those skilled in the art that, when reflectors 8 have a planar reflective surface of an optical quality and when at least one dimension of the reflective surface is extending transversally to the longitudinal axis of waveguide 4, the angular spread of rays emitted by each reflector 8 will be generally equal to that of same rays propagating in waveguide 4 before the reflection. Thus, the angular size of lens 6 should be made at least equal to the anticipated angular spread of light rays propagating in the waveguide to ensure that all rays emitted by reflectors 8 can be intercepted and redirected with collimation. In other words, the angular aperture of collimating lens 6 can be conveniently tied to the maximum propagation angle or to the acceptance angle of waveguide 4. The acceptance angle of waveguide 4 may be defined as the maximum angle of incident rays, with respect to the longitudinal axis, that the waveguide can accept and guide by means of TIR. According to one embodiment, the transversal angular aperture of collimating lens 6 may be advantageously selected to be at least equal or greater than $180°-2\theta_{TIR}$.

Since each reflector 8 is located directly in the focus of lens 6 or at least in a close proximity to the focus, the divergent beam emitted by reflector 8 may be collimated into a quasi-parallel beam and emitted forward along the optical axis of the lens. More specifically, a ray 212 of FIG. 5 illustrating an extreme ray from the angular distribution in waveguide 4 strikes a peripheral zone of lens 6 and is refracted by the lens with collimation along the optical axis of the lens. Similarly, another extreme angle 220 striking an opposing peripheral zone of collimating lens 6 is refracted toward the same direction. It may be appreciated that rays 214 and 218 exemplifying intermediate-angle out-of-axis rays will also be collimated by collimating lens 6 towards the same direction. An on-axis ray 216 propagating along the optical axis and striking the surface of lens 6 at a normal angle exits from waveguide 4 without change in the direction of propagation. Accordingly, substantially all rays in the divergent beam redirected by reflector 8 may be effectively collimated thus producing a highly directional beam at least in a plane which is perpendicular to the longitudinal axis of waveguide 4.

Figure 6:
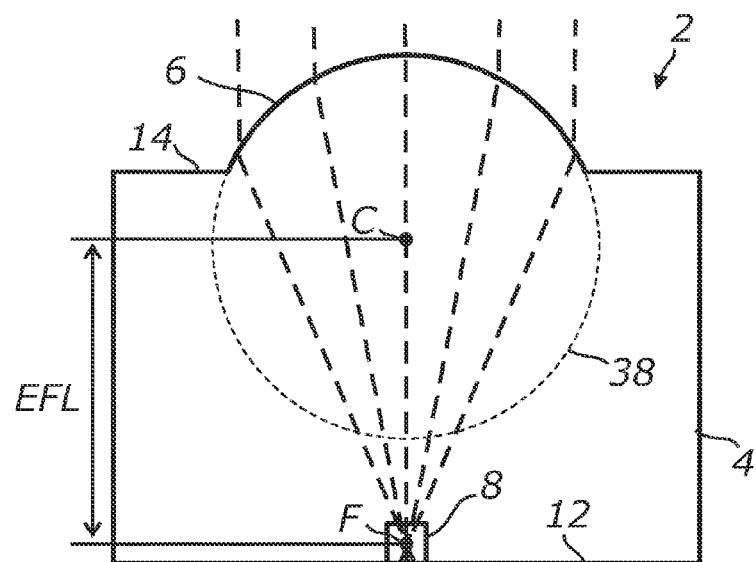
FIG. 6 is a schematic cross-sectional view of a collimating illumination system, showing principles of selecting a distance between a collimating lens and reflectors, according to at least one embodiment of the present invention.

Referring now to FIG. 6, collimating lens 6 has a spherical surface with the center of its curvature at a point C (which is also the center of the corresponding full circumference circle 38) and a focus at a point F. The distance from point C to point F defines the effective focal length (EFL) of collimating lens 6. Reflector 8 is positioned on the optical axis of collimating lens 6 so that the midpoint of its main reflective surface is positioned at the focal point F.

EFL of lens 6 may be found, for example, from the above discussed lens maker's equation. According to one embodiment, the total height of system 2, defined as the distance from the tip of collimating lens 6 to surface 12, may be made about equal to EFL+R or greater, where R is the radius of curvature of the lens. According to certain embodiments, the total height of system 2 or the average distance from collimating lens 6 to reflectors 8 may be selected from various other considerations as well.

A useful criterion for defining EFL and/or the location of point F can be, for example, the location of the area of maximum collimation power of collimating lens 6 for a given size of reflector 8. Generally speaking, the area of maximum collimation power may or may not be coincident with the focal area or the ideal focus of lens 6, particularly, due to spherical aberration, chromatic aberration and/or manufacturing imperfections. The aberrations occur due to the increased refraction and/or chromatic spread of light rays near the edge of a lens in comparison with the rays nearer to the lens center.

Therefore, for many applications, it may be advantageous to position reflectors 8 in the area of maximum convergence of a parallel beam of light that can be focused by the lens. Such area may be found analytically, from numeric optical modeling, raytracing or through an experiment for each lens shape that can be employed for collimating lens 6. The location of maximum collimating power may also be specific to the manufacturing process selected for making waveguide 4. Accordingly, reflectors 8 may be centered in the area of maximum convergence rather than in the ideal focal point. Alternatively, the tips or bases of reflectors 8 may be placed in such area depending on the desired flux distribution to be produced by system 2.

Certain applications may require using other criteria for the disposition of reflectors 8 with respect to lens 6 and its focal area. By way of example, the location of reflectors 8 along the optical axis may be selected based on the desired controlled angular spread of the collimated beam. By moving reflectors 8 slightly closer to collimating lens 6 or farther away from the lens along the optical axis, different angular distributions of light emitted by system 2 can be obtained while still providing a controlled and collimated beam with limited divergence.

Alternatively, or in addition to the above modification of reflector locations, reflectors 8 may be positioned with a slight offset from the ideal, on-axis positions with respect to collimating lens 6. This approach may also be useful for controlled spreading of the collimated beam.

In a yet further alternative, the divergence of the collimated beam also also be effectively controlled by varying the transversal size of reflectors 8, in which case the angular distribution of the collimated beam can be varied in a broad range, for example, between 3° and 60°, while providing a quality directional beam with sharply defined boundaries and minimum light scattering to the sides or glare.

It may be appreciated that the improved directionality of the beam emitted by system 2 is achieved, at least in part, by departing from the round shape of the transversal aperture of the prior-art side-emitting optical fibers and similar waveguide illumination devices. The non-round transversal aperture of system 2 combined with the appropriate shaping of lens 6 allow for the most advantageous shaping and positioning of the lens with respect to reflectors 8 and thus achieve the desired waveguide operation as a highly directional illumination system. When selecting the appropriate shape of lens 6, relevant design parameters may include the refractive index of the material of waveguide 4, a desired distance between the lens and reflectors 8, the size of the receiving aperture of the reflectors, as well as the expected divergence of light to be propagated through the waveguide.

Figure 7:
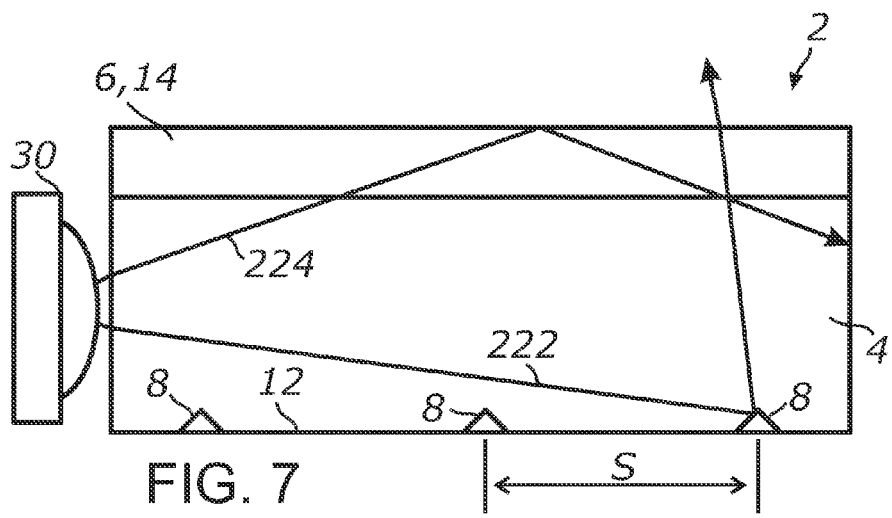
FIG. 7 is a schematic side view and raytracing of a collimating illumination system, showing spaced apart reflectors, according to at least one embodiment of the present invention.

FIG. 7 shows a side view of a portion of system 2 shown in FIG. 3. Reflectors 8 distributed along the longitudinal axis of waveguide 4 are spaced apart by a spacing distance S. Each reflector is formed by a V-shaped notch in surface 12 of waveguide 4. The spacing distance S can be made constant so that the reflectors will be located at periodic intervals or it can also be made variable along the length of waveguide 4. A pre-determined variable spacing can be advantageous for providing a more uniform distribution of light emission along the waveguide. Particularly, the spacing distance S can be gradually decreased in the direction of the intended light travel resulting in the density of reflectors 8 increasing as a function of the distance from the light input end of waveguide 4. As light rays propagating in waveguide 4 get depleted by preceding reflectors 8, the subsequent reflectors 8 may be disposed in incrementally smaller intervals so that light emission from the waveguide may be maintained at approximately the same level. It will be appreciated that reflectors 8 can be disposed along the length of waveguide 4 in any other suitable density or distribution pattern without changing the scope of this invention.

FIG. 7 further shows a light source 30 adjacent to a light input end of waveguide 4. Light source 30 may include a Light Emitting Diode (LED) or any other suitable source of light. Furthermore, light source 30 may also include multiple individual sources of light having the same or different colors. By way of example, light source 30 may incorporate R-G-B LEDs which intensities can be individually varied to produce a desired illumination color by mixing the respective colors of individual LEDs in waveguide 4. Light source 30 may also be attached to waveguide 4 using an optical adhesive to promote light coupling. A second light source 30 (not shown) may also be similarly provided on the other terminal end of waveguide 4 with reflector spacing, size and shape updated accordingly in order to provide a uniform collimated illumination along the entire length of the light emitting region of the waveguide. Alternatively, the other terminal end of waveguide 4 may be mirrored to reflect back light that may not have been extracted in a single passage through waveguide 4.

Referring further to FIG. 7, controlled light distribution and decoupling from waveguide 4 is illustrated by an example of rays 222 and 224 emanated by light source 30. Ray 222 enters waveguide 4 and strikes reflector 8 at wall 12 which changes the propagation angle of the ray and directs it toward the opposing wall 14 of waveguide 4 where collimating lens 6 is located. Collimating lens 6 intercepts and collimates ray 222 at least in the plane perpendicular to the waveguide's longitudinal axis (perpendicular to the plane of the drawing of FIG. 7). For comparison, ray 224 propagates in waveguide 4 without striking the reflectors 8 shown in FIG. 7 and may be decoupled from the waveguide by one of the subsequent reflectors 8 (not shown) along its path.

Reflectors 8 may be disposed at generally periodic intervals along the focal line of collimating lens 6. The average spacing distance S between reflectors 8 may be made relatively small or large, depending on the desired rate of light extraction from waveguide 4. Furthermore, the spacing distance can be made variable along the length of waveguide 4 in order to provide a more uniform light output from system 2, as discussed above.

Figure 8:
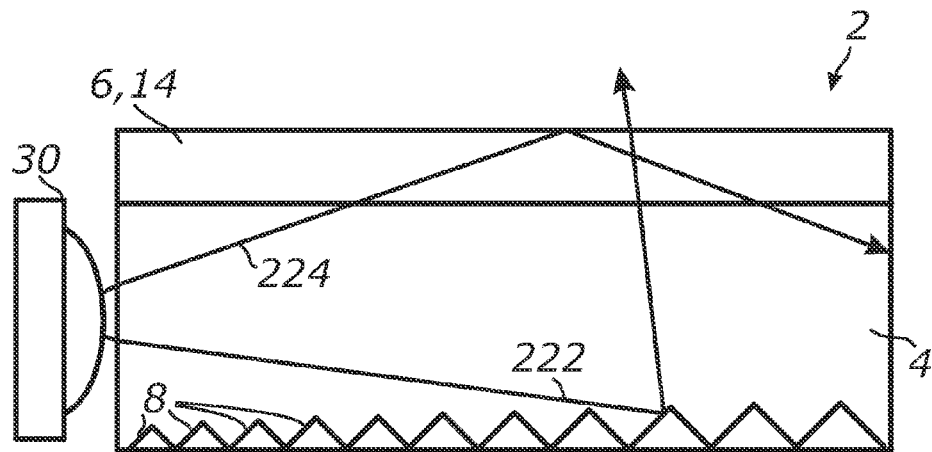
FIG. 8 is a schematic side view and raytracing of a collimating illumination system, showing reflectors with a high packing density, according to at least one embodiment of the present invention.

FIG. 8 depicts an embodiment of system 2 in which the spaces between reflectors 8 are practically eliminated and the reflectors are positioned adjacent to each other in a continuous strip along the focal line. As FIG. 8 further illustrates, the size of reflectors 8 may be incrementally increased along the direction of the intended light propagation in waveguide 4, as a function of the distance from the light input edge. Such arrangement of reflectors 8 may be used, for example, for producing a stable flux output along the length of light emitting region of the waveguide. Furthermore, the slope angles of the reflective surfaces of reflectors 8 may be varied along the focal line of lens 6, for example, by gradually increasing or decreasing with the distance to the light input edge.

Figure 9:
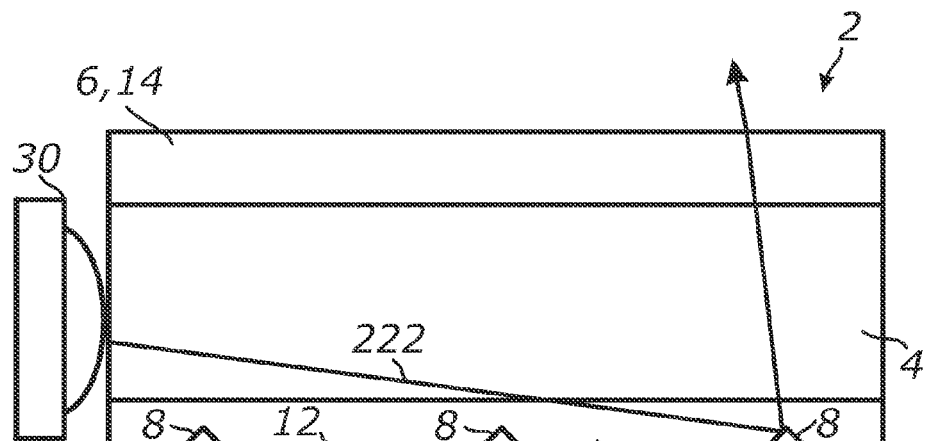
FIG. 9 is a schematic side view and raytracing of a collimating illumination system, showing a light emitting layer attached to a waveguide, according to at least one embodiment of the present invention.

FIG. 9 depicts an embodiment of system 2 in which waveguide 4 is a composite of two different bodies of the same material or two different transparent materials. Particularly, waveguide 4 comprises the main body and a light emitting layer 24 attached to the bottom surface of the main body. Reflectors 8 may be formed in light emitting layer 24.

Layer 24 should preferably be made from a transparent material which refractive index is approximately the same or similar to that of the main body of waveguide 4 so that no or little Fresnel reflection occurs at the respective optical interface. Layer 24 may be formed as an overlay to waveguide 4 in the form of a thin plastic sheet or film and can be made integral to waveguide 4 or attached externally to the waveguide with a good optical contact. Accordingly, referring to FIG. 9, ray 222 is shown crossing the boundary between the main body of waveguide 4 and layer 24 and then being redirected by reflector 8 towards collimating lens 6, which, in turn, further redirects ray 222 at least in a dimension which is transversal to the longitudinal axis of the waveguide. It is noted that layer 24 may be applied to the entire length of waveguide 4 or just to its light emitting region.

Figure 10:
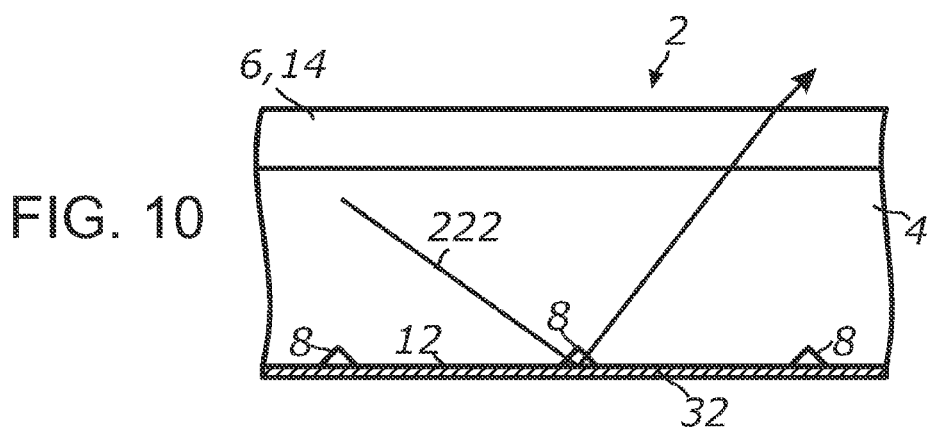
FIG. 10 is a schematic side view and raytracing of a collimating illumination system, showing a reflective layer attached to a waveguide, according to at least one embodiment of the present invention.

FIG. 10 shows an embodiment of system 2 comprising elongated waveguide 4 having opposing longitudinal surfaces 12 and 14, linear refractive lens 6 formed in surface 14 and a plurality of spaced apart reflectors 8 formed in surface 12. The linear lens 6 extends along at least the intended light emitting region of waveguide 4 and is provided with good collimating properties. Reflectors 8 are disposed in a strip along the focal line of lens 6.

The embodiment of system 2 shown in FIG. 10 further comprises an external reflective layer 32 attached to surface 12. This layer is preferably formed by a metalized mirror surface that prevents light from leaking downward through surface 12 and/or reflectors 8. Particularly, when reflectors 8 are configured to reflect light by means of TIR using an optically transparent reflective surface, some light impinging onto the reflective surface at greater than TIR angles with respect to the surface normal may escape from waveguide 4 through this surface. Reflective layer 32 reflects such stray light back into waveguide 4 thus allowing it to either continue propagating in the waveguide or exit through the collimating lens 6 at the opposing surface 14 with collimation toward a prescribed direction.

For example, referring further to FIG. 10, ray 222 passes through one of the surfaces of the V-shaped notch of reflector 8, passes through the respective interruption in surface 12 and strikes reflective layer 32. Subsequently, ray 222 specularly reflects from layer 32 and re-enters waveguide 4 through the second surface of the V-shaped notch. Ray 222 further propagates toward the opposing surface 14 where it strikes collimating lens 6. As ray 222 still arrives from the vicinity of the focal area of collimating lens 6, it may be further directed by lens 6 toward a direction parallel to the optical axis of the lens. Thus, ray 222 which may have been otherwise lost through the bottom surface 12 of waveguide 4 is emitted toward the designed direction with collimation.

Reflective layer 32 may be applied to the entire length of the light emitting region of waveguide 4 or just to the areas associated with reflectors 8. By way of example and not limitation, reflective layer 32 may be formed directly on surface 12 by vacuum metallization or applying a reflective foil. In a further non-limiting example, it may be formed by laminating surface 12 by a mirror film having an aluminized or silvered layer on a plastic film substrate. Laternatively, the surfaces of the V-notches or cuts that form reflectors 8 and which are exposed to the light propagating in waveguide 4 may also be metalized to prevent light escaping through these surfaces.

Figure 11A:
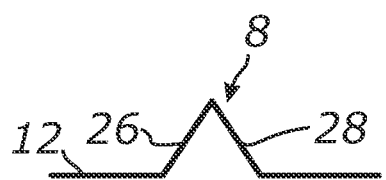
FIG. 11A through FIG. 11G show various profiles of reflectors in a longitudinal cross-sectional of a waveguide, according to at least some embodiment of the present invention.

FIG. 11A through FIG. 11G show various cross-sectional arrangements of reflectors 8, according to at least some embodiment of the present invention. In FIG. 11A, reflector 8 is formed by a prismatic groove in surface 12. The prismatic groove has a symmetrical V-shaped configuration defined by a first sloped surface 26 and a second sloped surface 28. Each of the surfaces 26 and 28 makes a predetermined dihedral angle to the surface 12 thus forming a light extracting feature for light rays propagating in the waveguide mode.

Depending on the location of the light input end of waveguide 4, the appropriate one of the surfaces 26 and 28 may be configured to reflect light by TIR. For example, if the light source is positioned at the terminal end of waveguide 8 which is faced by surface 26, this surface should be configured for light extraction. When waveguide 4 is associated with two light sources attached to the opposing terminal ends or when the terminal end opposing to the light input end of the waveguide is mirrored, both faces 26 and 28 may be configured as TIR reflectors.

The desired reflectivity and light extracting function may be achieved, for example by providing an optically smooth finish to the respective surfaces, in which case the reflection will occur due to TIR at certain incidence angles. The reflection at incidence angles greater than the TIR angle may be enhanced by providing a mirrored finish for the respective surface. Alternatively, either one or both reflective surfaces 26 or 28 may be made opaque and provided with a light scattering finish in which case each such surface may significantly contribute to the divergence of the reflected light beam.

Figure 11B:
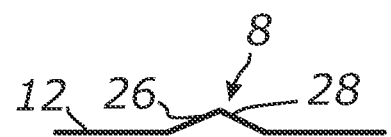

In FIG. 11B, reflector 8 is shown to have a relatively low profile compared to the case illustrated in FIG. 11B. Accordingly, the relatively shallow V-groove of FIG. 11B is formed by surfaces 26 and 28 inclined at smaller dihedral angles to surface 12.

Figure 11C:
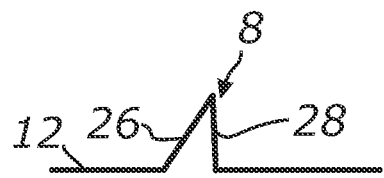
Figure 11D:
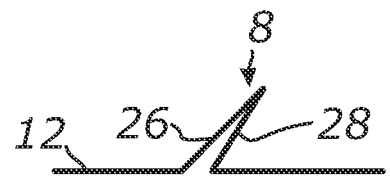
Figure 11E:
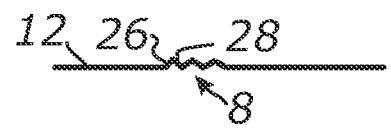

In FIG. 11C, reflector 8 has an asymmetric profile where surface 26 is inclined at an appropriate dihedral angle to surface 12 for light extraction and surface 28 extends perpendicularly to surface 12. FIG. 11D shows reflector 8 made in the form of a slanted undercut in surface 12. In FIG. 11G, an alternative shape of the slanted undercut forming reflector 8 is shown, in which surfaces 26 and 28 are about parallel to each other. In FIG. 11E, reflector 8 is formed by multiple corrugations in surface 12 where each corrugation has respective surfaces 26 and 28.

Figure 11F:
Figure 11G:
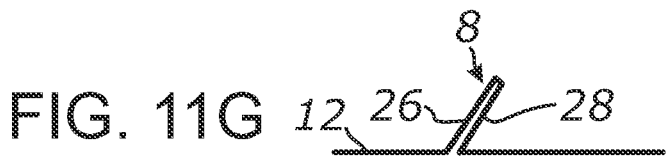

FIG. 11F depicts reflector 8 formed by a light scattering element attached to surface 12. The light scattering element may be configured to receive light propagating in waveguide 4 by means of TIR and reflect such light by means of diffuse scattering. By way of example and not limitation, the light scattering element may include white scattering paint. In another non-limiting example, the light scattering element may include textured surface having a matt finish.

Figure 12A:
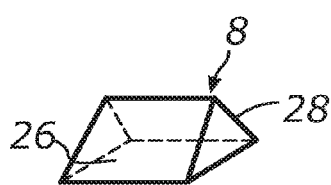
FIG. 12A through FIG. 12I show various three-dimensional shapes of reflectors, according to at least some embodiment of the present invention.

FIG. 12A through FIG. 12I show various three-dimensional shapes of reflectors 8. FIG. 12A shows reflector 8 formed by a prismatic V-shaped groove or notch having surface 26 and 28 inclined at an angle to the surface normal. The groove may have a square or rectangular base at surface 12. Additionally, the groove forming reflector 8 may have a well defined linear geometry. In one embodiment, such groove may extend across the entire width of surface 12.

Figure 12B:
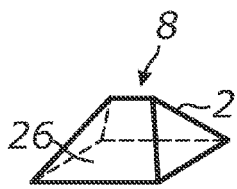
Figure 12C:
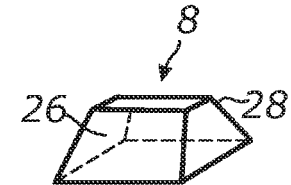
Figure 12D:
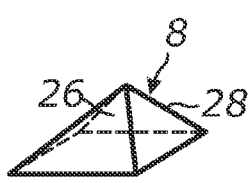
Figure 12E:
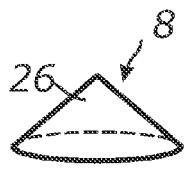
Figure 12F:
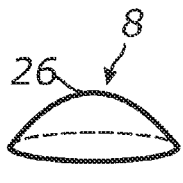
Figure 12G:
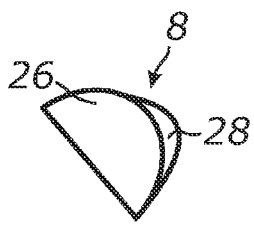
Figure 12H:
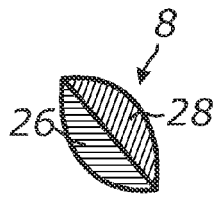
Figure 12I:
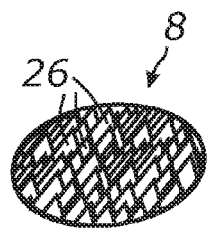

FIG. 12B shows reflector 8 formed by a tapered V-cut in which all four surfaces or facets are sloped with respect to the surface 12. In FIG. 12C, reflector 8 is shown to have a shape of a truncated pyramid. In FIG. 12D, reflector 8 is shown in the form of a pyramid. In FIG. 12E, reflector 8 is shown to have a conical shape where surface 26 has an annular geometry. A dome-shaped reflector is shown in FIG. 12F where surface 26 has a curved profile. FIG. 12G shows reflector 8 with a combination of surface 26 being planar and surface 28 being curved at least in one dimension. FIG. 12H shows reflector 8 formed by curved intersecting surfaces 26 and 28. FIG. 12I shows reflector 8 comprising a surface texture having multiple reflective surfaces 26.

While the above examples illustrated reflective surfaces 26 and/or 28 reflectors 8 having either planar or curved shapes, it should be understood that the planar and curved shapes can be used interchangeably in various designs of reflectors 8 and may also include any combination or composite of the planar and curved surfaces without changing basic illumination system structure and the scope of this invention.

While the preceding description exemplified a cross-section of waveguide 4 having a generally rectangular shape with a spherical bulge in the top portion representing collimating lens 6, any other suitable cross-section of the waveguide and/or linear collimating lens 6 can be used provided that system 2 has the same basic arrangement.

Furthermore, it is noted that reflectors 8 are not limited to various surface relief features formed in the surface of waveguide 4. Any other light extraction features functionally equivalent or similar to reflectors 8 may also be used. For example, diffraction gratings, holograms or various-type scattering elements distributed along the longitudinal axis of waveguide 4 may be used to extract light from the waveguide and direct at least a portion of such light to lens 6 for collimation. Various light scattering paints or pigments applied to the surface of waveguide 4 may also be used to provide light extraction and emitting at least a part of light in a collimated form. However, it should be understood that at least some light scattering elements may only be able to direct a portion of light to lens 6 while the rest of redirected light may either exit from waveguide 4 without collimation or may remain confined in the waveguide and may thus be recycled.

Figure 13:
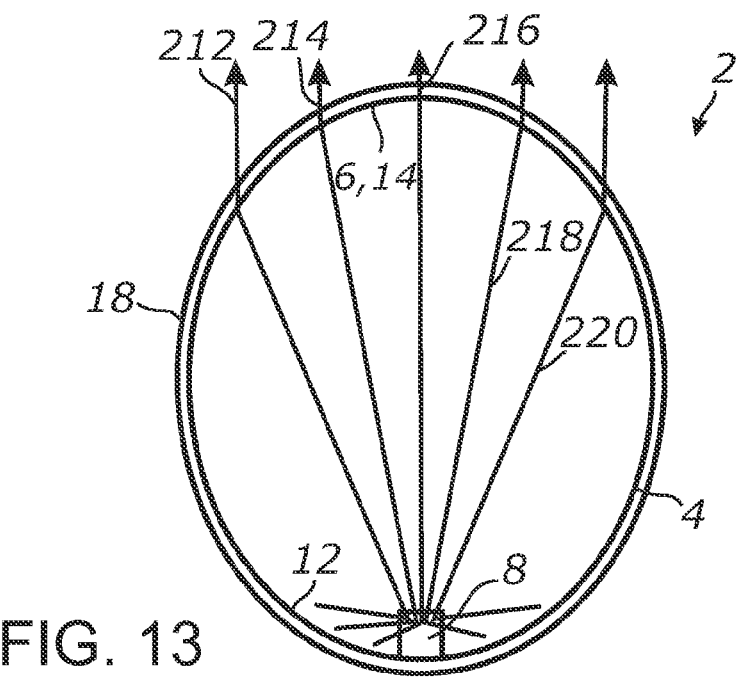
FIG. 13 is a schematic views and raytracing of a collimating illumination system, showing an elliptical transversal cross-section of a waveguide and a reflector, according to at least one embodiment of the present invention.

FIG. 13 shows an embodiment of the present invention in which waveguide 4 has an elongated transversal cross-section approximating an elliptical shape. Waveguide 4 is also shown with an optional cladding layer 18 which can be useful from protecting the waveguide core from the environment. In such elongated configuration of the waveguide, each reflector 8 is positioned at one of the extremities or vertices of the elliptical shape and collimating lens 6 is formed at the opposing end of the elliptical shape. The reflector 8 depicted in FIG. 13 has a rectangular transversal cross-section. The aperture of the reflector is substantially smaller than the aperture of lens 6. Additionally, the aperture of lens 6 is selected to be sufficient to intercept at least a substantial part of light rays reflected by reflector 8.

It will be appreciated by those skilled in the art of optics that a slightly elliptical shape of the lens also possesses good light focusing and collimating properties. Similarly to the principles discussed above, reflectors 8 are located at or around the effective focal area of collimating lens 6 to provide for the desired collimation effect. Accordingly, referring to FIG. 13, light rays 212 through 220 as well as all other rays within the acceptance angle of collimating lens 6 striking reflector 8 are extracted from waveguide 4 and emitted with high collimation at least in the plane perpendicular to the longitudinal axis of the waveguide.

By way of example, when waveguide 4 is made from PMMA or the material with a similar refractive index, the ratio between the major axis and the minor axis of the ellipse most closely approximating the waveguide cross-section should preferably be about 1.2±10%, although other suitable ratios can also be selected.

Figure 14:
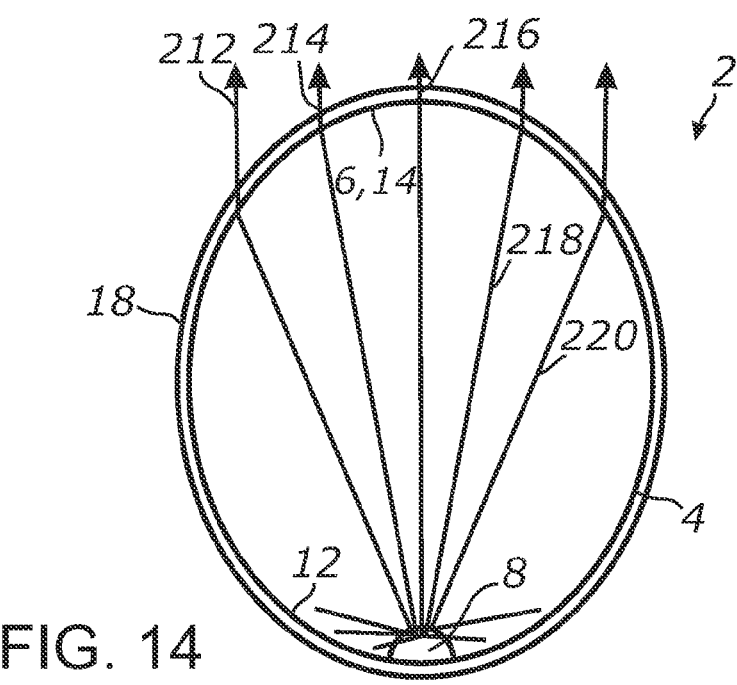
FIG. 14 is a schematic views and raytracing of a collimating illumination system, showing an elliptical transversal cross-section of a waveguide and a reflector having an alternative cross-sectional profile, according to at least one embodiment of the present invention.

FIG. 14 shows an embodiment of system 2 which is similar to that of FIG. 13 except that reflector 8 has a different transversal cross-section with a curvilinear profile. Such reflector 8 may be produced, for example, by a small notch or cut in surface 12 by a mechanical tool, laser ablation, etching or any other suitable means. Accordingly, light rays 212 through 220 are similarly reflected by the reflector of FIG. 14 at such angles which are sufficient to suppress TIR at surface 14. Lens 6 intercepts the divergent fan of rays and collimates it into a parallel beam.

Figure 15:
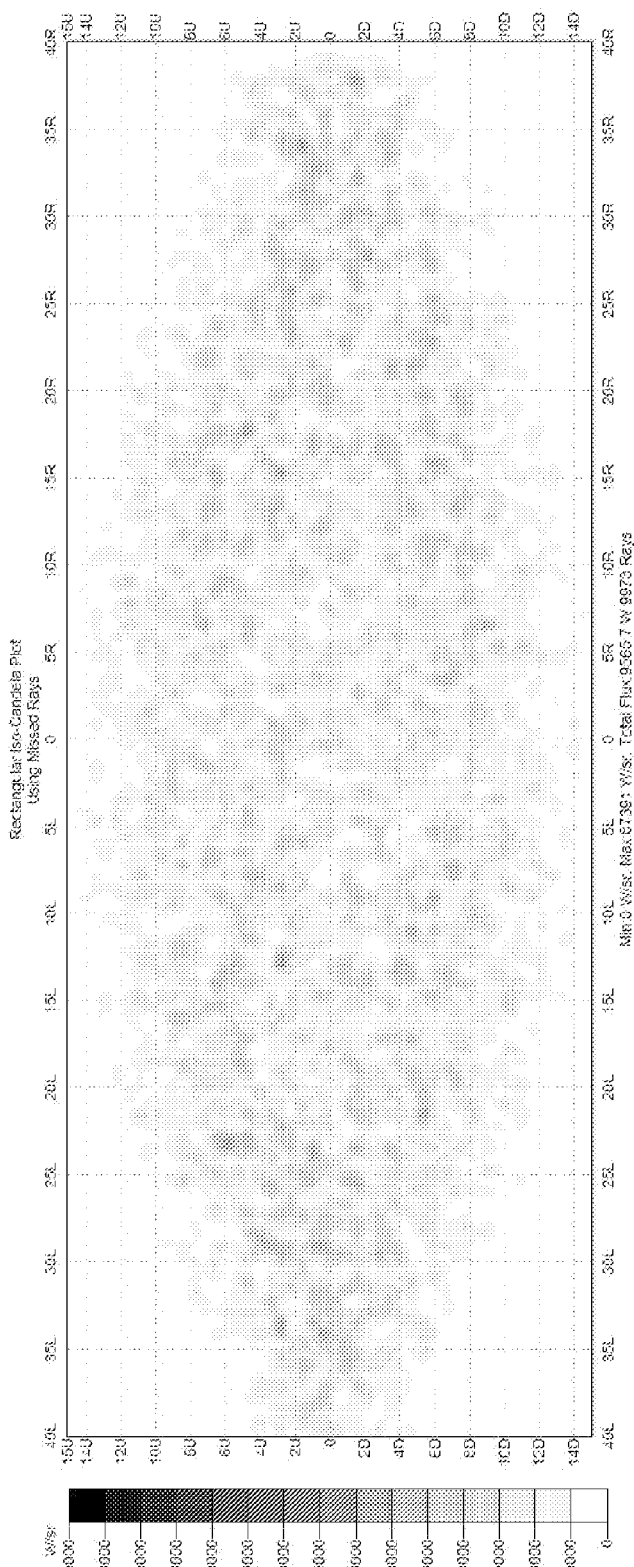
FIG. 15 is a schematic luminance plot for a round cross-section of a waveguide.
Figure 16:
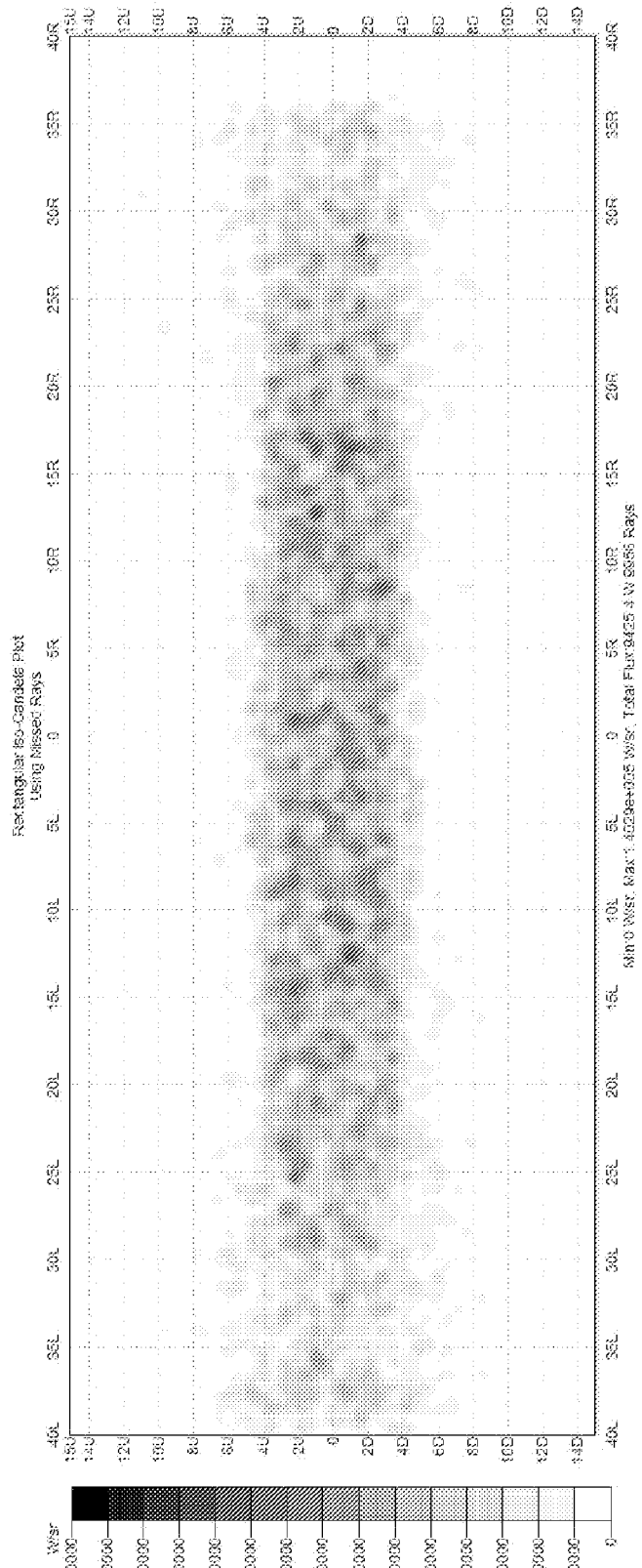
FIG. 16 is a schematic luminance plot for a pre-selected elliptical transversal cross-section of a waveguide, according to at least one embodiment of the present invention.

FIG. 15 and FIG. 16 illustrate the effect of configuring waveguide 4 in the form of an elongated elliptical shape with the above axis ratio and the near-focal positioning of reflectors 8 compared to the case where such reflectors are formed in a surface of the round rod light pipe.

In FIG. 15, a luminance iso-candela plot is shown for a 2-mm reflector located at a longitudinal wall of a round PMMA rod having a 22 mm diameter. The light beam produced by the reflector is approximated by a compact light source having the same dimensions as the reflector and emitting a divergent beam within a fixed angular cone. It will be appreciated that such system will emit a generally divergent light beam which can be characterized by a rectangular luminance plot representing intensities of the emitted light at specific viewing angles.

As it can be seen from the iso-candela plot of FIG. 15, the angular spread of the beam exiting the rod is about 30° and the spread is greatest in the direction perpendicular to the rod longitudinal axis. In the round geometry of the rod and considering the conventional materials used for waveguides such as PMMA, the maximum angular spread of the emitted beam can hardly be further reduced since the reflector can only be positioned out of focus (see, e.g., the discussion in reference to FIG. 1). Accordingly, the collimating ability of the round rod is essentially limited.

FIG. 16 shows an iso-candela plot for the same reflector, which is similarly approximated by the same compact light source having the same angular beam distribution and luminous output, but where said reflector is positioned at a vertex of an elliptical rod having a 24 mm major axis and 20 mm minor axis (the above-mentioned 1.2:1 ratio). As it can be seen, the angular spread of the emitted beam is reduced by about three times down to approximately 10°. Additionally, the angular distribution is made more uniform along the axis of the rod. It can also be seen that, due to the improved collimation of the elliptical rod, illumination intensity along the longitudinal axis of the rod is also significantly increased in an approximate proportion to the reduction of the angular spread of the light beam.

It will be appreciated that, due to the inherent off-focus reflector location in the circular rod, the collimation of the emitted beam cannot be substantially improved in the prior art devices by further reducing the size of the reflector since the reflector is always positioned off focus. In contrast, a further reduction of the reflector aperture in the cylindrical rod may result in a further decrease of the ray divergence and an improved beam collimation, doe to the focal position of the reflector. Thus, by selecting the proper size of the reflector and its position along the optical axis of the lens formed by the cylindrical rod shape, the collimation of side-emitted beam can be controlled in a very broad range.

The elliptical shape of waveguide 4 may be obtained by various means. One possible method may include the initial forming of a round-aperture, fully polymerized, solid-core optical fiber and then applying pressure from the sides so that the waveguide obtains an elongated shape closely resembling an ellipse. An optional heat may also be applied to the fiber for softening the polymer and helping it to retain the new shape. Subsequently, referring to FIG. 17, the formed elliptical fiber may be placed into a channel holder 50 that will help retaining the required near-elliptical shape even if some internal mechanical stress remains. Collimating lens 6 will be formed by one of the vertices of the ellipse while reflectors 8 should be located at the opposing vertex of the ellipse. Reflectors 8 may be formed in waveguide 4 while it is still in the round configuration or at any subsequent stage, after shaping the collimating lens 6.

Another method of forming elliptical waveguide 4 may include forming an elliptical-aperture fiber and then polymerizing the fiber material so that the required shape can be retained without applying the external pressure. Similarly, reflectors 8 may be formed during the polymerization stage or in a subsequent processing or forming stage.

Waveguide 4 may be made flexible along its length and conforming to various shapes provided that the bend angles allow for the continued light propagation by means of TIR. For example, it may be made and used similarly to side-emitting solid-core optical fibers while the novel structure of system 2 can provide an improved light collimation of the light emitted along its length. At least a portion of waveguide 4 may also be enclosed in a protective sleeve or jacket such as a PVC tube for added protection of the waveguide's core.

FIG. 18 and FIG. 19 show embodiments of collimating illumination system 2 in which waveguide 4 has alternative shapes or outlines in a transversal cross-section. As in the embodiments employing an elliptical profile, the collimating lens 6 of FIG. 18 and FIG. 19 may extend across the entire surface 14.

In FIG. 18, waveguide 4 is shaped in the form of a double-convex linear cylindrical lens. According to one embodiment, one of the two opposing convex surfaces, namely surface 14 may be designated as collimating lens 6 so that reflectors 8 may be formed in the opposing surface 12.

According to one embodiment, reflectors 8 may be formed in both surfaces 12 and 14 in which case each of the surfaces 12 and 14 will act as a collimating lens for the respective series of reflectors. It will be appreciated that such configuration of system 2 could provide collimated illumination from two opposing longitudinal sides of waveguide 4. In FIG. 19, waveguide 4 is shaped in the form of a plano-convex cylindrical lens having convex surface 14 and planar surface 12.

FIG. 20 shows an embodiment of collimating illumination system 2 having a further alternative cross-sectional shape of waveguide 4. In FIG. 20, collimating lens 6 comprises a cylindrical refractive lens 20 and further includes two opposing reflective walls 22 disposed symmetrically at slanted angles in respect to the optical axis of the lens. The slopes of reflective walls 22 with respect to the optical axis are preferably selected to provide for TIR when receiving light redirected by reflectors 8. As in the above examples, each reflector 8 may be located in the focal area of collimating lens 6 and may preferably have a substantially smaller transversal aperture than the transversal aperture of the lens. Particularly, the width of reflector 8 in the cross-section perpendicular to the longitudinal axis of waveguide 4 should be substantially smaller than the width of the collimating lens 6. The appropriate ratio between the above widths may be selected based on the desired degree of collimation and should preferably be less than 1:5.

The operation of system 2 of FIG. 20 is shown in the notation of the foregoing drawings by an example of several rays. Accordingly, rays 214, 216 and 218 emitted by an individual reflector 8 are collected and collimated by the refractive cylindrical lens 20. The peripheral rays 212 and 220 are collected and collimated by the opposing refractive walls 22. It will be appreciated that by employing both the refractive portion of lens 6 and the side walls reflecting by TIR, a considerable acceptance angle of lens 6 may be obtained. At the same time, the degree of collimation may also be made fairly high.

It will also be appreciated that even though the cross-sectional profile of waveguide 4 in FIG. 20 is perceivably more complex compared to, for example, a round or elliptical profile of the waveguide, it generally does not impede the light conducting ability of the waveguide by means of TIR. This is due to the facts that TIR will occur at the walls of waveguide 4 as long as the propagation angle with respect to the longitudinal axis of the waveguide is maintained at less than $90°-\theta_{TIR}$. If the walls of waveguide 4 are sufficiently smooth and parallel to the longitudinal axis, the reflections from such should not affect the propagation angle. Each reflector 8, however, changes the propagation angle of the incident light that impinges onto its active aperture. With the appropriate configuration, reflector 8 redirects the incident light at a new propagation angle which may become greater than $90°-\theta_{TIR}$ at surface 14 resulting in the escape of that portion of light through collimating lens 6 with beam collimation.

Accordingly, waveguide 4 may be configured with at least of part of its cylindrical body having a cross-section shape of any other light focusing or collimating structure or device. Any known linear, or line-focus, collimating structure may be used for shaping waveguide 4 and/or collimating lens 6. Additionally, suitable linear collimating structures may also be formed by employing the cross-section of a known axisymmetrical (point-focus) device and may further include single-stage or multiple-stage concentrators or collimators capable of collimating the light emitted by the linear arrangement of reflectors 8. Some of the useful known optical systems that may be incorporated into system 2 and provide the light collimating function of linear-focus lens 6 may include but are not limited to various imaging of non-imaging lenses, aspherical lenses, lens arrays, Fresnel lenses, TIR lenses, gradient index lenses, diffraction lenses, mirrors, Fresnel mirrors, spherical mirrors, parabolic mirrors, mirror arrays, and trough mirrors.

Figure 21:
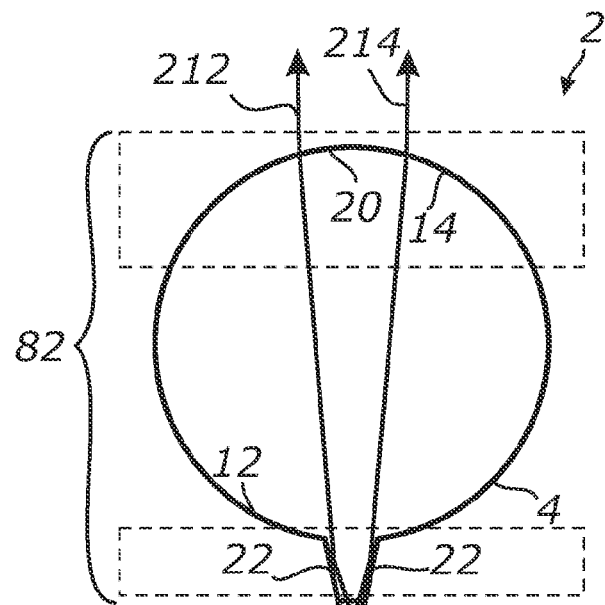
FIG. 21 is a schematic view of a collimating illumination system, showing a protrusion in a waveguide surface, according to at least one embodiment of the present invention.
Figure 22:
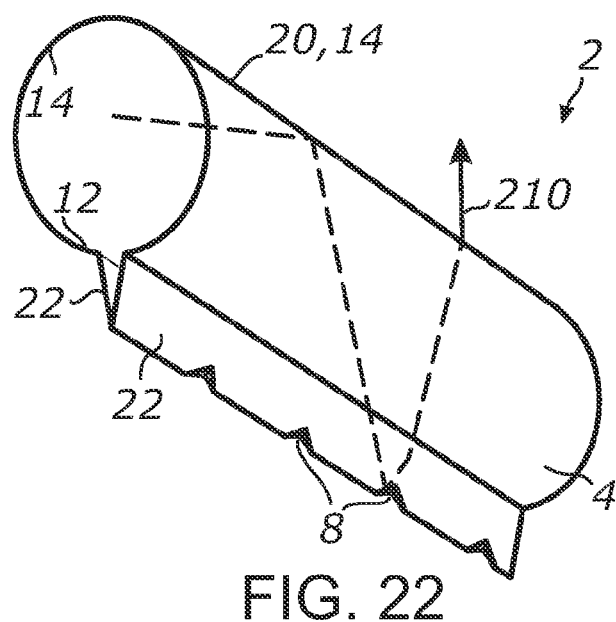
FIG. 22 is a schematic perspective view of a collimating illumination system shown in FIG. 21, according to at least one embodiment of the present invention.

Certain embodiments of system 2 may include variations of the embodiment shown in FIG. 20 where waveguide 4 has other shapes and where reflective surfaces 22 are formed at different locations with respect to lens 20 and/or reflectors 8. Particularly, FIG. 21 and FIG. 22 depict various views of an embodiment of collimating system 2 which includes cylindrical waveguide 4 having a generally spherical or slightly elliptical shape in a transversal cross-section. Two opposing longitudinal halves of waveguide 4 generally define the top surface 14 and bottom surface 12. Waveguide 4 is further provided with a relatively sharp protrusion in surface 12. The protrusion defines two opposing reflective surfaces 22 extending uniformly along the length of waveguide 4. Reflectors 8 are formed by periodic transversal notches in the ridge of the protrusion. The longitudinal portion of waveguide 4 which is opposite to the protrusion has a function of a linear collimating lens and hereby forms the respective collimating lens 20.

In operation, rays 212 and 214 of FIG. 21 propagating in waveguide 4 by TIR and striking reflector 8 are reflected toward the opposing surface 14. Surfaces 22 are located in the immediate proximity of reflector 8 and should be properly designed to intercept a substantial part of light rays redirected by the reflector. Surface 22 extend from reflector 8 up and away from the optical axis of lens 20. In such configuration, surface 22 remain to be reflective by means of TIR for all rays redirected by reflector 8.

Accordingly, rays 212 and 214 undergo TIR reflections from the opposing reflective surfaces 22 causing said rays to further propagate at smaller angles from the optical axis of lens 20 (which is also a cross-sectional axis of symmetry of the cylindrical waveguide 4) thus causing a preliminary collimation of the rays in the direction of the lens. As rays 212 and 214 are further intercepted and refracted by the convex surface of lens 20, their collimation is further enhanced. Thus, in the embodiment illustrated in FIG. 21 and FIG. 22, a portion of convex surface 14 which forms lens 20 and a pair of reflective surfaces 22 act cooperatively as a two-stage collimating element 82.

In FIG. 22, the operation of this embodiment of system 2 is illustrated by an example of ray 210. Ray 210 propagates in waveguide 4 by means of TIR until it is intercepted by one of the reflectors 8. The respective reflector 8 redirects ray 210 at such an angle that TIR is suppressed when ray 210 strikes the surface of lens 20. Accordingly, ray 210 is decoupled from the waveguide through lens 20 which provides additional bend for the ray towards the plane of symmetry of waveguide 4 and thus further improves the directionality of light emitted from surface 14.

Figure 23:
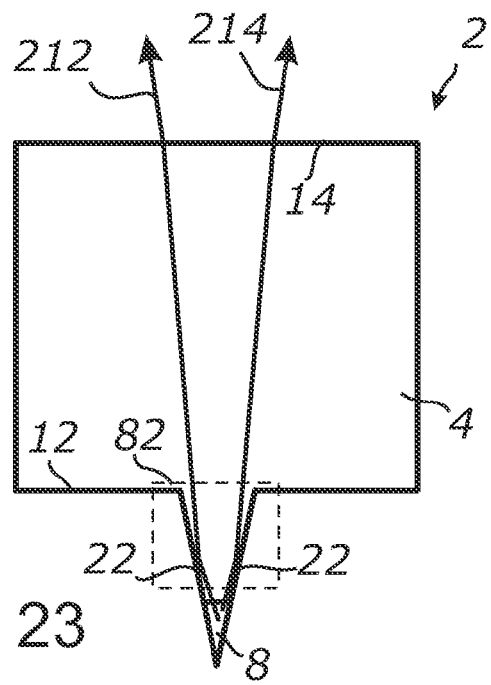
FIG. 23 is a schematic view of a collimating illumination system, showing a yet further alternative cross-section for a waveguide comprising planar reflective walls of a collimating element, according to at least one embodiment of the present invention.

FIG. 23 depicts an embodiment of collimating system 2 in which surface 14 is essentially planar and collimating element 82 is formed by a pair of surfaces 22. Although surface 14 of FIG. 23 does not provide additional collimation as in the example of FIG. 21, certain beam directionality with somewhat reduced collimation may still be provided by reflective surfaces 22.

Figure 24:
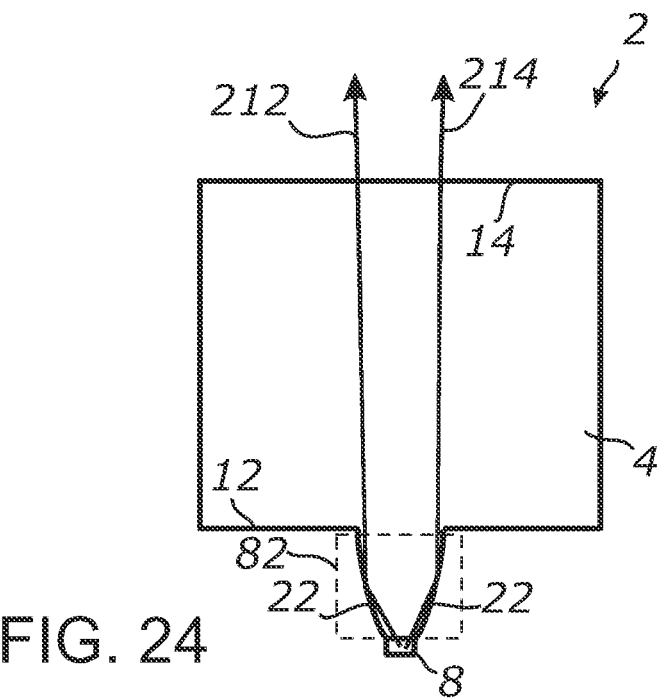
FIG. 24 is a schematic view of a collimating illumination system, showing a yet further alternative cross-section for a waveguide comprising curved reflective walls of a collimating element, according to at least one embodiment of the present invention.

In FIG. 24, a variation of the embodiment of FIG. 23 is shown where reflective surfaces 22 have curved profiles for an improved collimation. The curved surfaces 22 should preferably have a parabolic shape or any other suitable shape resulting in the improved collimation compared to the planar surfaces.

Figure 25:
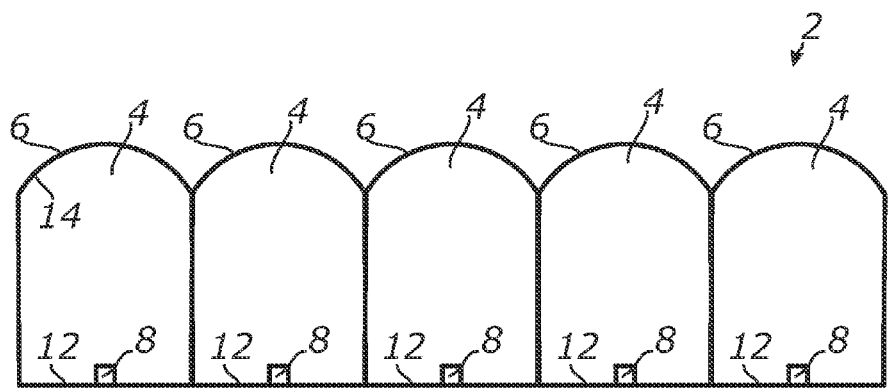
FIG. 25 is a schematic cross-sectional view of a collimating illumination system portion, showing an array of elongated waveguides arranged into a panel, according to at least one embodiment of the present invention.

FIG. 25 shows an embodiment of collimating system 2 in which multiple waveguide structures, such as those illustrated in FIG. 19, are positioned adjacent to each other to form a planar collimating panel. While only a few of the waveguide structures are shown in FIG. 25, it should be understood that system 2 may incorporate any number of them, including very large arrays of individual waveguides 4 with the respective lenses 6, each having a longitudinally extending string of reflectors 8.

Figure 26:
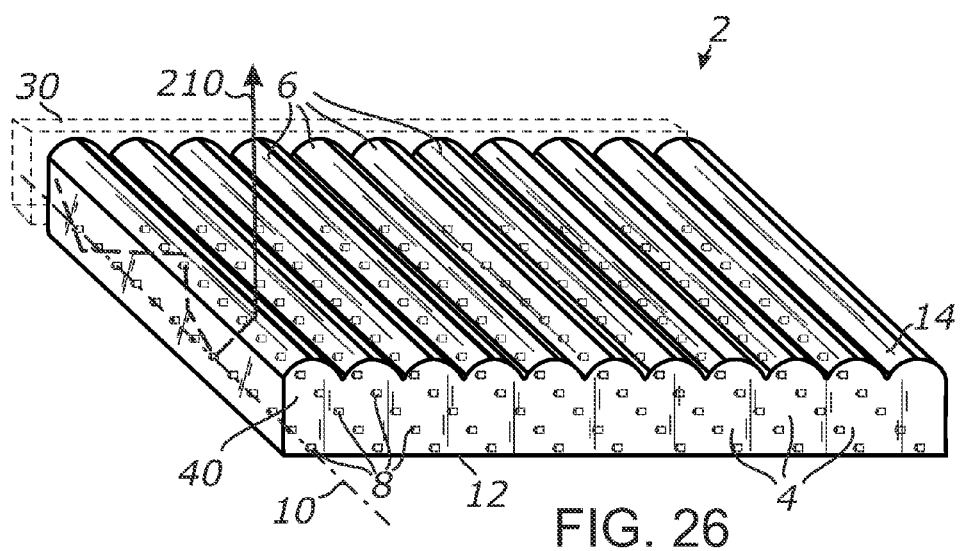
FIG. 26 is a schematic view of a collimating illumination system, showing an array of collimating lenses arranged on a common waveguide substrate, according to at least one embodiment of the present invention.

In FIG. 26, a further embodiment of system 2 is shown in which an array of elongated waveguide structures 4 with the respective linear lenses 6 and strips of reflectors 8 is formed on a single lens-array waveguide substrate. Such structure of collimating system 2 may be formed, for example, by a planar lenticular lens array 40 of densely packed linear lenses 6 formed in surface 14 and an array of matching parallel strips of reflectors 8 formed in the opposing surface 12. In a cross-section, each reflector 8 should preferably be centered with respect to the optical axis or plane of the matching collimating lens 6.

Lens array 40 may be made from of a sheet or planar plate or slab of a transparent material by appropriate contouring its frontal surface and obtaining surface relief features approximating individual refractive lenses. Each collimating lens 6 lens may have a spherical or aspherical light input surface and should be configured to receive a divergent beam of light from reflectors 8 and collimate such light at least in a dimension transversal to the longitudinal axis of the lens. Each reflector 8 may be formed by a small-area cut or notch made in surface 12 transversally to the longitudinal axis of the respective lens.

In accordance with at least one embodiment of the present invention, the focal length of each collimating lens 6 in the lens array 40 is selected to approximate the thickness of the lens array. More particularly, when each linear collimating lens 6 in the lens array has a convex spherical shape with the radius of curvature R and the index of refraction of the transparent material forming the lens array is n, the approximate lens array thickness T may be found from the following expression:

$$T \approx \frac{nR}{n-1}.$$

Thus, each of reflectors 8 formed in surface 12 will be located in an immediate proximity of the focal area of the respective collimating lens 6. In an exemplary case of the lens array 40 made from PMMA, the lens array thickness may be about three times the radius of the prevailing curvature of the lenses 6 forming the array.

As the transversal cross-section of the effective waveguide is now extended by longitudinal joining multiple waveguides 4 together, the light emanated by light source 30 attached to a terminal edge of the formed lens array may thus propagate along the longitudinal axis of the array by means of TIR from surfaces 12 and 14 as well as from the longitudinal side walls of the array while also traveling across multiple lenslets and/or opticules.

In operation, referring to FIG. 26, ray 210 propagates along the longitudinal axis of the lens array until it strikes reflector 8 which extracts said ray through surface 14 with collimation by lens 6 disposed above the reflector. It will be appreciated that system 2 may thus be configured to receive light on one or both of its longitudinal edges, distribute such light through its body and emit at least a substantial portion of the distributed light through surface 14 with collimation at least in the plane perpendicular to the longitudinal axis of the lens array.

Figure 27:
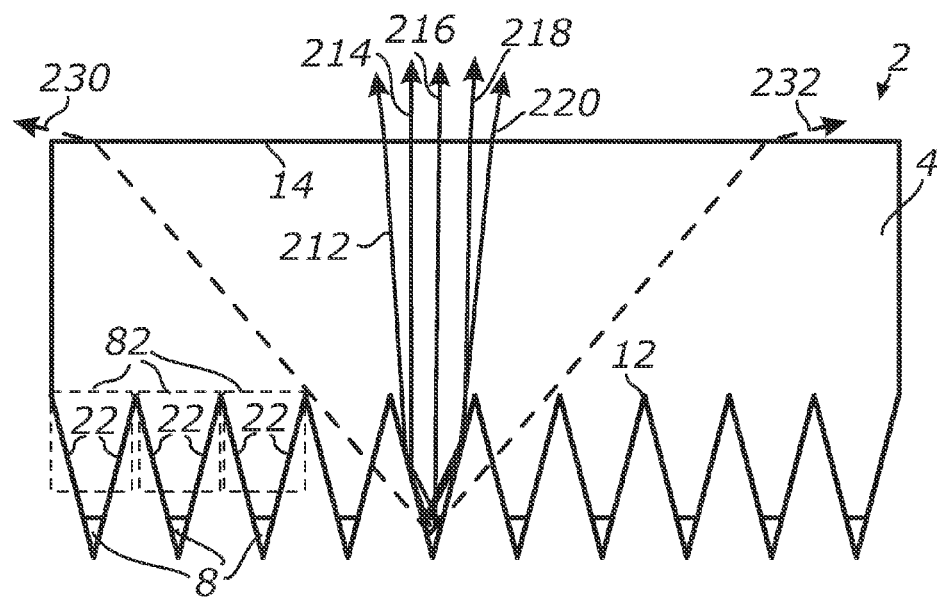
FIG. 27 is a schematic view of a portion of a collimating illumination system, showing, in a transversal cross-section, a waveguide panel comprising a corrugated surface, according to at least one embodiment of the present invention.
Figure 28:
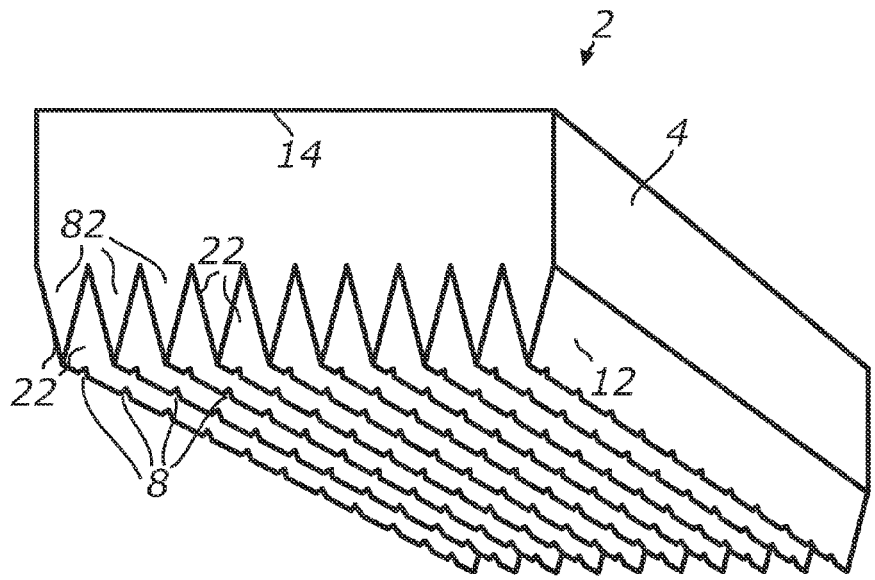
FIG. 28 is a schematic perspective view of a collimating illumination system portion shown in FIG. 27 according to at least one embodiment of the present invention.

FIG. 27 and FIG. 28 depict various views of an embodiment of collimating system 2 in which a planar waveguide 4 comprises surface corrugations defining a plurality of reflective surfaces 22. Each surface 22 is disposed at a slanted angle with respect to a normal to the prevailing plane of waveguide 4. The corrugations are formed in surface 12 which acts as a TIR surface and a light collimating surface. The opposing surface 14 acts as a light emitting surface. As illustrated in FIG. 28, series of reflectors 8 are represented by periodic notches formed along the protruding peaks or ridges of the corrugations.

Referring back to FIG. 27, a fan of rays 212 through 220 initially propagating in waveguide 4 by means of TIR and striking one of the reflectors reflector 8 is collimated by reflective surfaces 22 and exits from waveguide 4 through the opposing planar surface 14. Imaginary rays 230 and 232 illustrate the "would-be" optical paths of the extreme rays of the reflected fan of rays if reflective surfaces 22 were absent.

Thus, the collimating system 2 of FIG. 27 and FIG. 28 may also be configured to produce a highly directional beam at least in the plane perpendicular to the longitudinal axis of the corrugations formed in surface 12.

The structures shown in FIG. 26 and FIG. 28 may be produced by a variety of means. By way of example and not limitation, any such structure may be formed in a single process by injection molding, compression molding, or hot embossing from a sheet of optically transparent material such as PMMA or other polymer. In an alternatively non-limiting example, the lenticular lens array of FIG. 26 may be produced by casting or extrusion and reflectors 8 may be subsequently formed in surface 12 by means of laser ablation, micromachining, embossing, etching, screen printing or the like methods. In a yet further exemplary alternative, either one or both of the lens array and the array of reflectors 8 may be formed separately in a sheet-form material and then laid down onto a planar substrate sheet or plate to form a monolithic waveguiding and collimating structure.

Further details of operation of collimating system 2 shown in the drawing figures as well as its possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A collimating illumination system, comprising:
    a planar optical waveguide defined by a first major surface and an opposing second major surface extending parallel to said first major surface, said waveguide is configured for guiding light along a general propagation direction in response to optical transmission and a total internal reflection from at least one of said first and second major surfaces;
    a plurality of linear collimating elements formed in said first major surface and aligned parallel to said general propagation direction; and
    a plurality of light extraction elements arranged into a parallel array of linear strips, each of said strips extending parallel to said linear collimating elements and disposed near or at a focal area of at least one of said linear collimating elements;
    wherein each of said strips of said light extraction elements is configured to receive light propagating within said planar optical waveguide along said general propagation direction and redirect at least a substantial portion of the received light toward said linear collimating elements and out of said waveguide;
    wherein said waveguide is a lens array having a thickness T $$T = \frac{nR}{n-1},$$

defined from the following expression: where R is a radius of curvature of lenses forming said lens array and n is the index of refraction of a material of said lens array.

2. A collimating illumination system as recited in claim 1, wherein said planar optical waveguide further comprises a cladding layer.

3. A collimating illumination system as recited in claim 1, further comprising a light source attached to a terminal end of said planar optical waveguide.

4. A collimating illumination system as recited in claim 1, wherein one of the terminal ends of said waveguide is mirrored.

5. A collimating illumination system as recited in claim 1, wherein said light extraction elements are disposed in a plurality of discrete locations within each of said strips, said locations being separated by spacing areas.

6. A collimating illumination system as recited in claim 1, wherein said light extraction elements are disposed in a plurality of discrete locations within each of said strips, said locations being separated by spacing areas of a variable width.

7. A collimating illumination system as recited in claim 1, wherein each of said light extraction elements comprises a cut or notch formed in a surface of said waveguide transversely to said general propagation direction.

8. A collimating illumination system as recited in claim 1, wherein each of said light extraction elements comprises at least one reflective surface inclined at an angle with respect to said general propagation direction.

9. A collimating illumination system as recited in claim 1, wherein each of said light extraction elements comprises at least one surface relief feature selected from the group of elements consisting of cavities, holes, extensions, bulges, prisms, prismatic grooves, pyramids, cones, conical cavities, pyramidal cavities, funnel-shaped cavities, surface texture, reflective surfaces, refractive surfaces, diffraction gratings, holograms, and light scattering elements.

10. A collimating illumination system as recited in claim 1, wherein each of said linear collimating elements is configured to intercept at least a substantial part of light rays extracted by one or more said light extraction elements and collimate said light rays at least in a plane perpendicular to said general propagation direction.

11. A collimating illumination system as recited in claim 1, wherein each of said linear collimating elements comprises a surface relief feature shaped in the form of an elongated structure having a transversal cross-section of a light-focusing or light-collimating optical element.

12. A collimating illumination system as recited in claim 1, wherein each of said linear collimating elements is selected from the group of optical elements consisting of imaging lenses, nonimaging lenses, spherical lenses, aspherical lenses, lens arrays, Fresnel lenses, TIR lenses, gradient index lenses, diffraction lenses, mirrors, Fresnel mirrors, spherical mirrors, parabolic mirrors, mirror arrays, and trough mirrors.

13. A collimating illumination system as recited in claim 1, wherein each of said linear collimating elements comprises a surface relief feature configured to reflect light rays by means of a total internal reflection when said rays propagate within said waveguide within a predefined angular range from a longitudinal axial direction of said linear collimating elements.

14. A collimating illumination system as recited in claim 1, wherein each of said linear collimating elements comprises at least two opposing reflective walls each disposed at a slanted angle with respect to a longitudinal axis of the collimating element and having a planar shape.

15. A collimating illumination system as recited in claim 1, wherein each of said linear collimating elements comprises at least two opposing reflective walls each disposed at a slanted angle with respect to a longitudinal axis of the collimating element and having a curved shape.

16. A collimating illumination system as recited in claim 1, wherein each of said linear collimating elements comprises a lenticular refractive lens.

\* \* \* \* \*

UNITED STATES PATENT AND TRADEMARK OFFICE
CERTIFICATE OF CORRECTION

| | |
|---|---|
| PATENT NO. | : 9,097,826 B2 |
| APPLICATION NO. | : 13/647175 |
| DATED | : August 4, 2015 |
| INVENTOR(S) | : Sergiy Vasylyev |

It is certified that error appears in the above-identified patent and that said Letters Patent is hereby corrected as shown below:

In the claims

In Claim 1, Column 22, lines 4 to 13, the formula $T \approx \dfrac{nR}{n-1}$ should appear between words "expression:" and "where", and should read as follows:

> wherein said waveguide is a lens array having a thickness T defined from the following expression:
> 
> $$T \approx \frac{nR}{n-1},$$
> 
> where R is a radius of curvature of lenses forming said lens array and *n* is the index of refraction of a material of said lens array.

Signed and Sealed this
Fifteenth Day of December, 2015

Michelle K. Lee
*Director of the United States Patent and Trademark Office*